United States Patent [19]

Diaz et al.

[11] Patent Number: 5,689,648

[45] Date of Patent: Nov. 18, 1997

[54] METHOD AND APPARATUS FOR PUBLICATION OF INFORMATION

[75] Inventors: Stephen H. Diaz, Palo Alto; Scott Summit, Portola Valley, both of Calif.

[73] Assignee: Raychem Corporation, Menlo Park, Calif.

[21] Appl. No.: 830,165

[22] Filed: Jan. 31, 1992

[51] Int. Cl.$^6$ ........................................... G06F 13/00
[52] U.S. Cl. .......................... 395/226; 395/229; 455/3.1; 455/3.2; 455/4.2; 348/473; 348/552
[58] Field of Search ........................ 358/142, 903; 455/3.1, 3.2, 4.2; 364/401; 395/925

[56] References Cited

U.S. PATENT DOCUMENTS

| | | | |
|---|---|---|---|
| 4,159,417 | 6/1979 | Rubincam | 235/375 |
| 4,422,093 | 12/1983 | Pargee, Jr. | 358/12 |
| 4,435,047 | 3/1984 | Fergason | 350/334 |
| 4,532,554 | 7/1985 | Skala | 358/257 |
| 4,638,356 | 1/1987 | Frezza | 358/118 |
| 4,639,225 | 1/1987 | Washizuka | 434/308 |
| 4,700,387 | 10/1987 | Hirata | 380/20 |
| 4,739,510 | 4/1988 | Jeffers et al. | 380/15 |
| 4,740,912 | 4/1988 | Whitaker | 364/900 |
| 4,820,167 | 4/1989 | Nobles et al. | 434/336 |
| 4,829,558 | 5/1989 | Welsh | 372/92 |
| 4,833,710 | 5/1989 | Hirashima | 380/20 |
| 4,855,725 | 8/1989 | Fernandez | 340/706 |
| 4,880,665 | 11/1989 | Adler et al. | 427/126.3 |
| 4,882,675 | 11/1989 | Nichtberger et al. | 364/401 |

(List continued on next page.)

FOREIGN PATENT DOCUMENTS

| | | |
|---|---|---|
| 0390611 | 10/1990 | European Pat. Off. . |
| 537756-A2 | 4/1993 | European Pat. Off. . |
| 2639750 | 6/1990 | France ................. G09F 9/35 |
| WO 86/06238 | 10/1986 | United Kingdom . |
| 2185361 | 7/1987 | United Kingdom ............ H04L 23/00 |

OTHER PUBLICATIONS

*Text Search Examiner Training Manual for the Automated Patent System (APS)*, Section 5, pp. 5–1 to 5–3, Nov. 30, 1990, U.S. Department of Commerce, U.S. Patent and Trademark Office.

Fidler, "Newspaper Design 2000 and Beyond," American Press Institute J. Montgomery Curtis Memorial Seminar, Sep. 1988.

Cohen, "Digital Transmission Packed Into Cable TV Channel," *Electronics*, Dec. 1, 1983, pp. 85–86.

User's guide for Lexis/Nexis System, pp. 49–76 and 251–265.

Hideshima et al., "Digital . . . CATV Line," tech. paper presented at NCTA Annual Convention, Washington, D.C., 1984, pp. 90–94 Chapter 7, pp. 182–183.

Automated Patent System (APS), Nov. 30, 1990, US Dept. of Commerce, USPTO, 5–2 thru 5–3.

"Teletex system (eletronic newspapers) introduced in US" Video Systems, Jul. 1978.

*Primary Examiner*—Gail O. Hayes
*Assistant Examiner*—Gita D. Shingala
*Attorney, Agent, or Firm*—Herbert G. Burkard; Bruce M. Bertram; Townsend and Townsend and Crew

[57] ABSTRACT

A system and devices for publication of newspapers and the like. The system uses an electronic memory/display unit (24) which preserves the convenience of printed material, but which has the advantages of a computer display. The system utilizes a cable television (CATV) network to distribute the information. Data are transmitted over the system from a newspaper publication facility (2). The newspaper publication facility is provided with a data processing facility (4) that transmits newspaper data (6) to a satellite transmitting facility (8). The transmitted data are provided to a cable television satellite receiving station (12) by way of satellite link (14). Signal generators (16) are coupled to the satellite link and provide appropriate signals to a CATV network transmission facility (18). Network transmission facility (18) transmits newspaper signals over a CATV line (20) to a plurality of subscriber facilities (22) with the electronic memory/display units.

17 Claims, 31 Drawing Sheets

U.S. PATENT DOCUMENTS

| | | | |
|---|---|---|---|
| 4,890,321 | 12/1989 | Seth-Smith et al. | 380/20 |
| 4,928,177 | 5/1990 | Martinez | 358/142 |
| 5,010,499 | 4/1991 | Yee | 364/521 |
| 5,073,930 | 12/1991 | Green et al. | 380/10 |
| 5,089,904 | 2/1992 | Fergason | 359/52 |
| 5,093,718 | 3/1992 | Hoarty et al. | 358/84 |
| 5,195,183 | 3/1993 | Miller et al. | 395/275 |
| 5,444,768 | 8/1995 | Lemaire et al. | 379/68 |

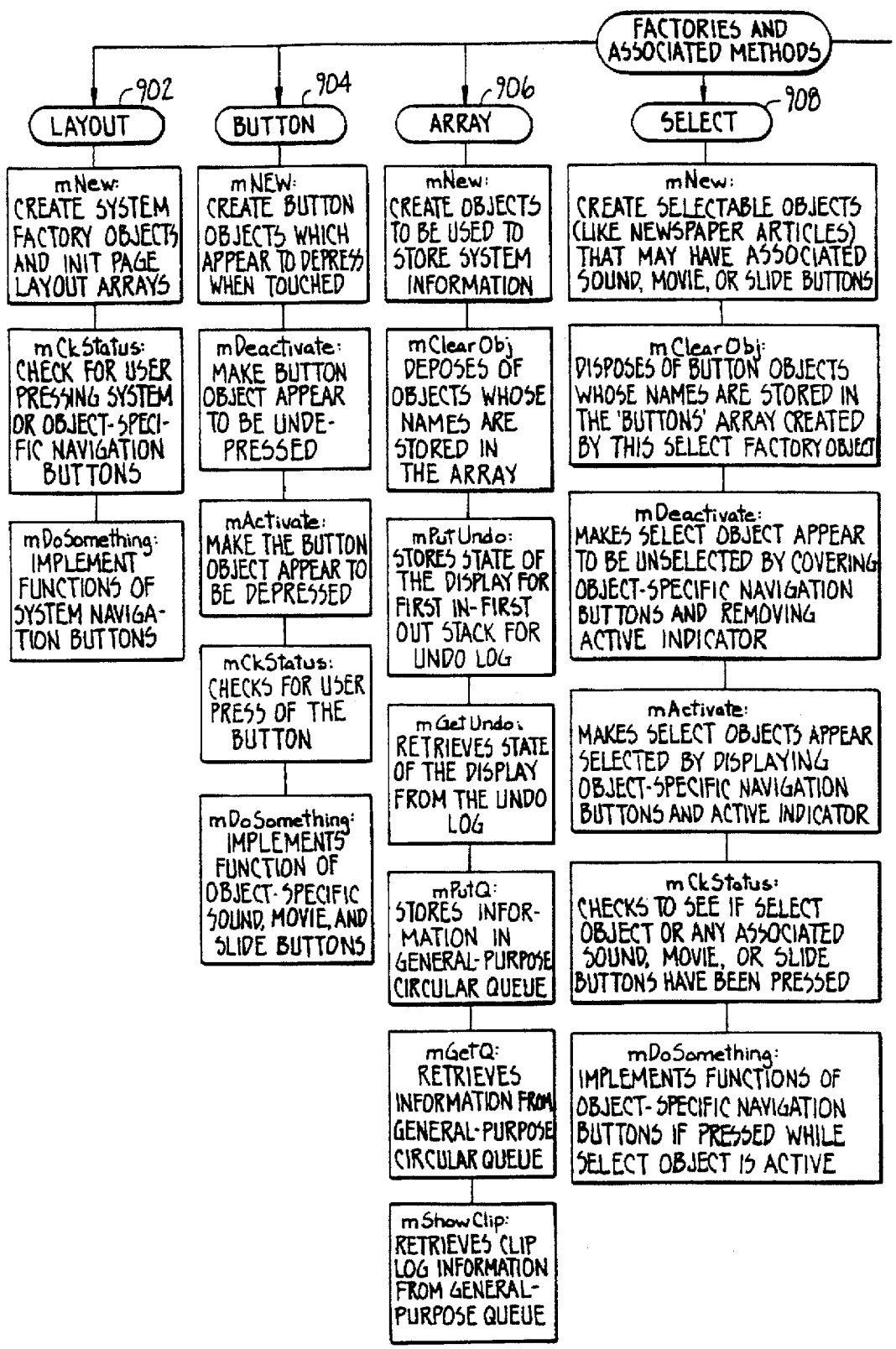
FIG. 9A1

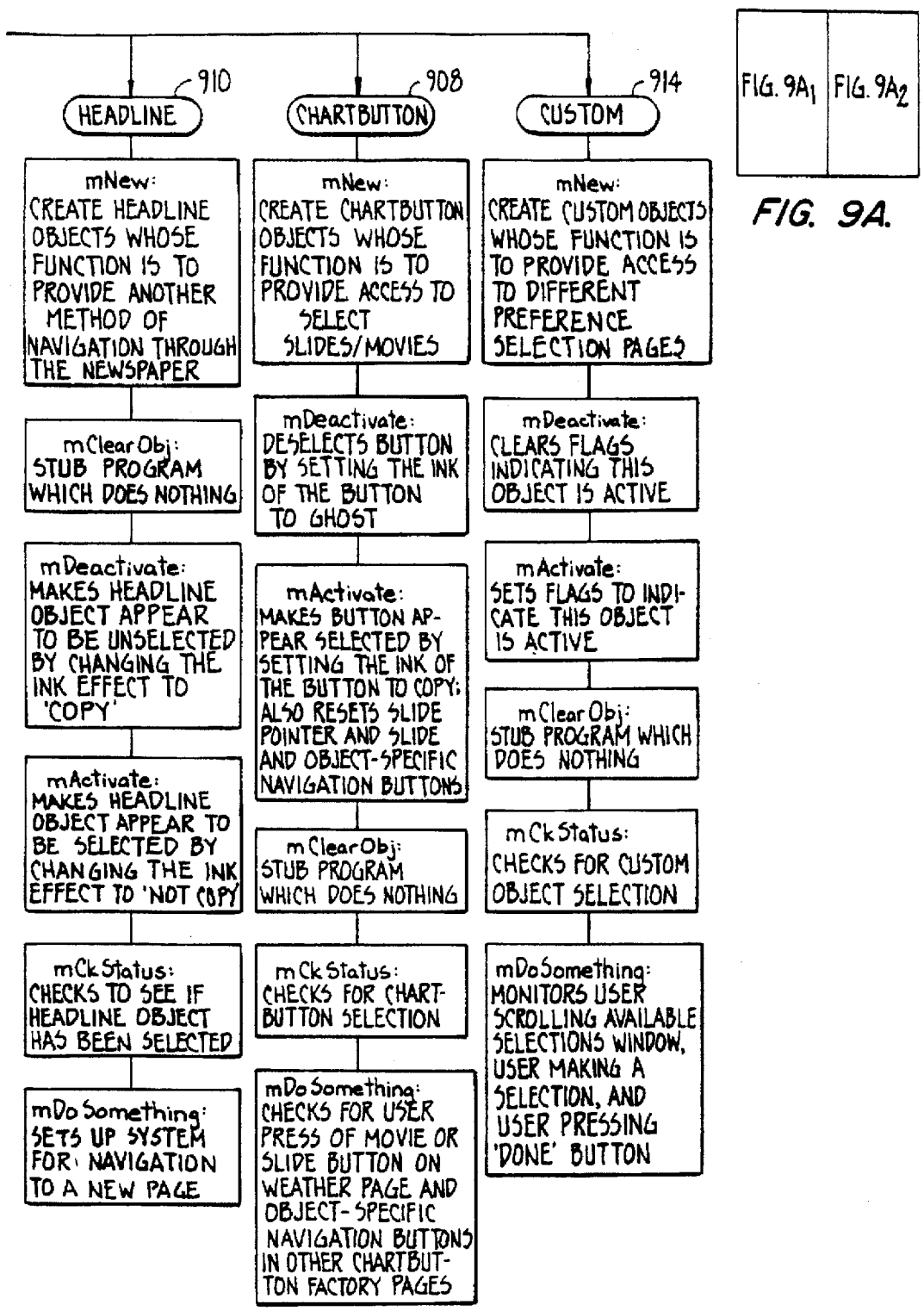

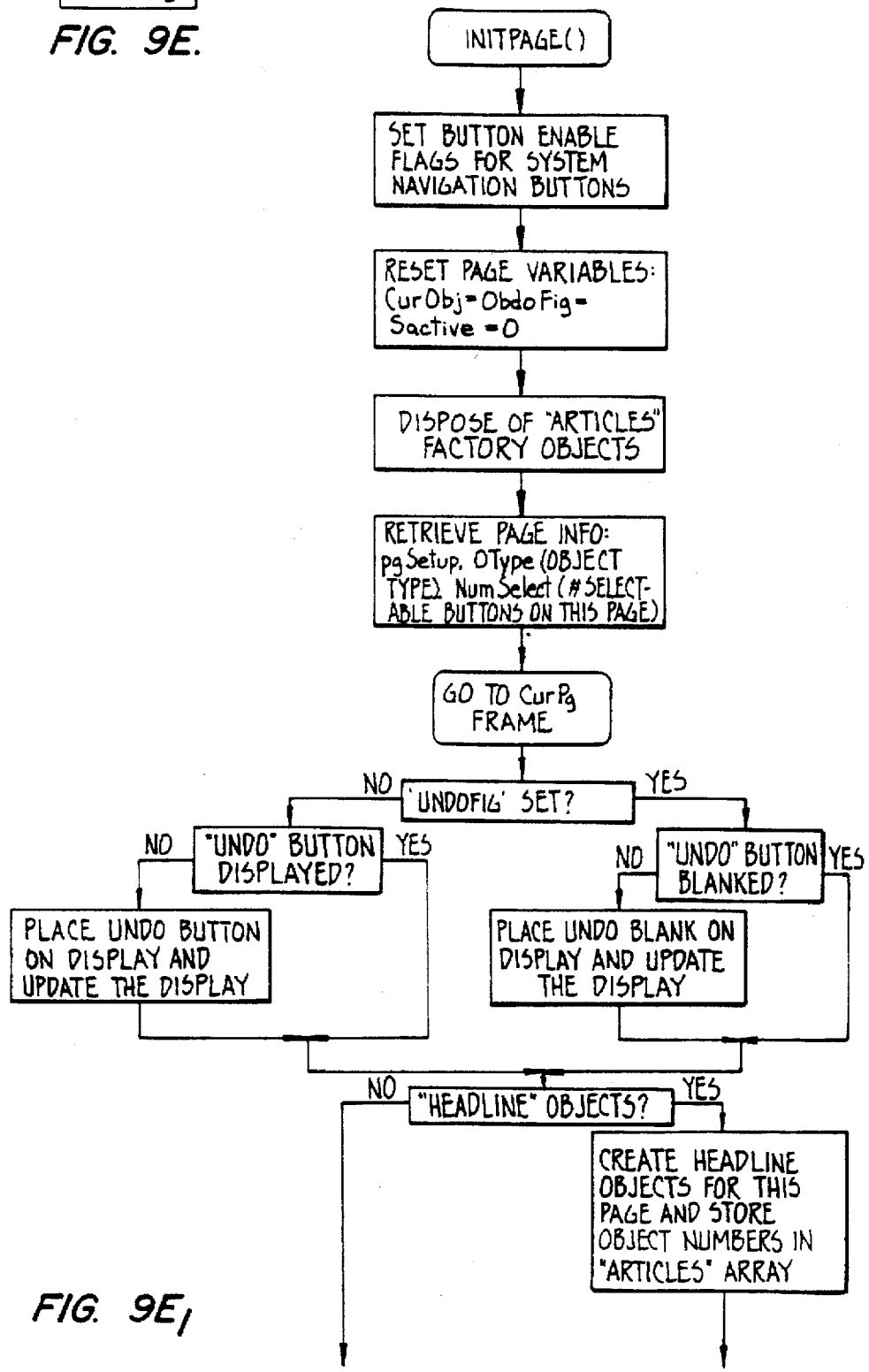

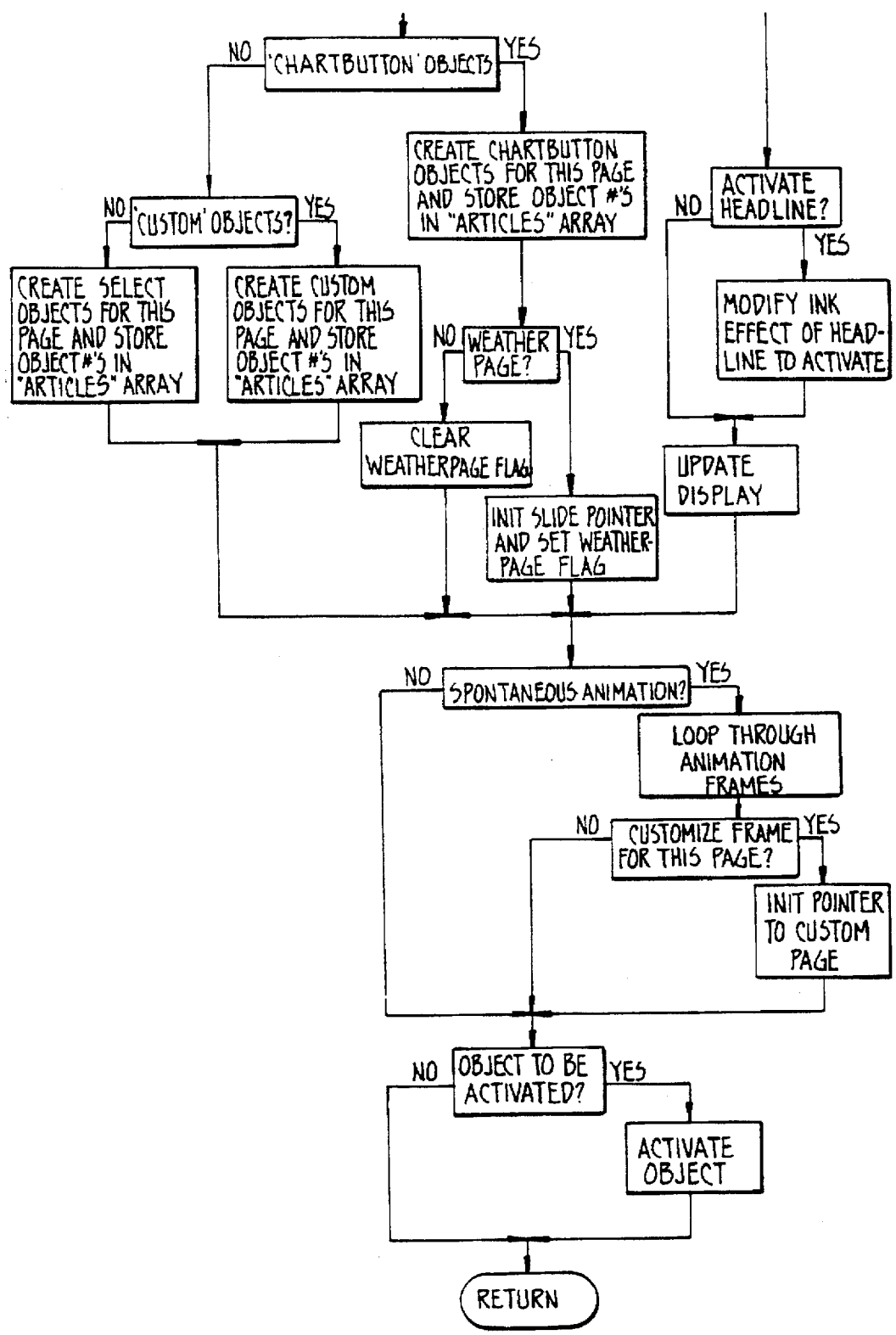
FIG. 9E₂

Monday May 6, 1991 — San Francisco Bay Area Focus — The Times — 9:30 am Edition —1006

More S&L Figures Indicted

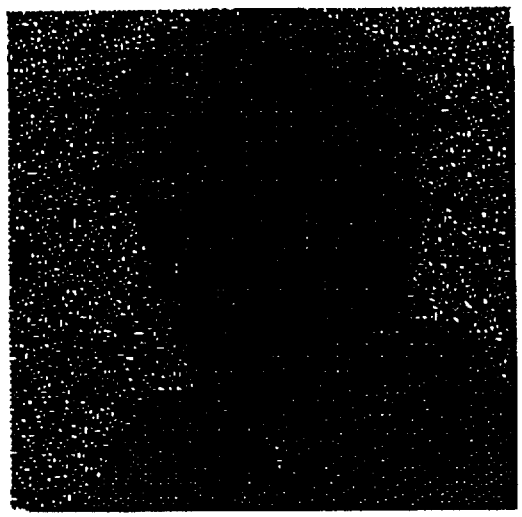

At the urging of Federal Deposit Insurance Corp. Chairman L. William Seidman, banking industry leaders are conducting secret discussions to try to find a way to pay for the staggering cost of bank failures without turning to taxpayers for help. —1008

Bankers say they are determined not to let the banks' problems repeat the

Fiber Optics Head For Home by John Free

High-capacity optical fibers in telephone networks promise dial-up high-definition TV movies, picture phone service, electronic catalog shopping,

High-tech goggles are key to night warfare

By Dan Stober and Mike Langberg

Key among the advantages American forces dem-

Military draft is unlikely option —1010

By Nick Anderson

If war comes to the Middle East, and if it brings many casualties, and if the armed forces

Getting Ready for a Last Hurrah

California's Assembly Speaker Willie Brown may be on his way out, but it won't be quietly SACRAMENTO In a time that has been

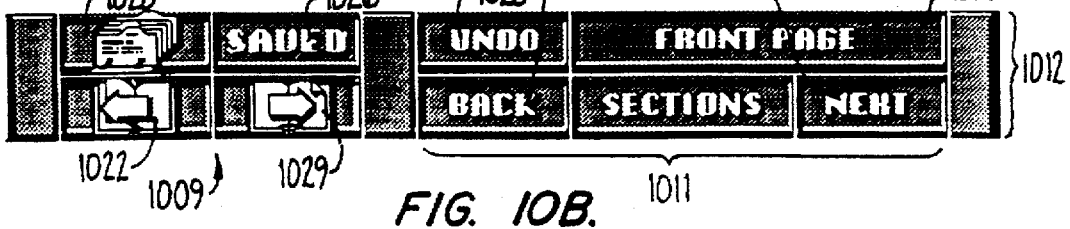

FIG. 10B.

Fiber Optics and more.

An engineer at a Bell Communications Research (Bellcore) laboratory slips a high-definition videodisc into a Sony player. Moments later, identical super-sharp pictures —a rocket launch, colorful nature scenes, a parade, bizarre microscopic creatures— appear on two 18-inch monitors. In an adjacent mini-theater at

A System on Overload

By Evelyn Richards

It was exactly 2:25 p.m. last Jan. 15 when, out of the

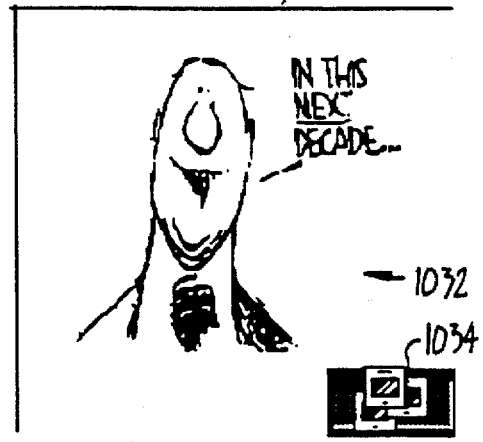

corner of his eye, Jim Nelson spotted an alarming sea of red spreading across the screens of 75 video monitors in the control center of AT&T's vast long-distance network. The screens normally are filled with bland charts and maps of the United States. For Nelson, the manager of the Bedminster, N.J., center, the red warning signals were an unmistak-able sign of crisis.

"We have the big one," an assistant exclaimed.

The nation's largest tele-

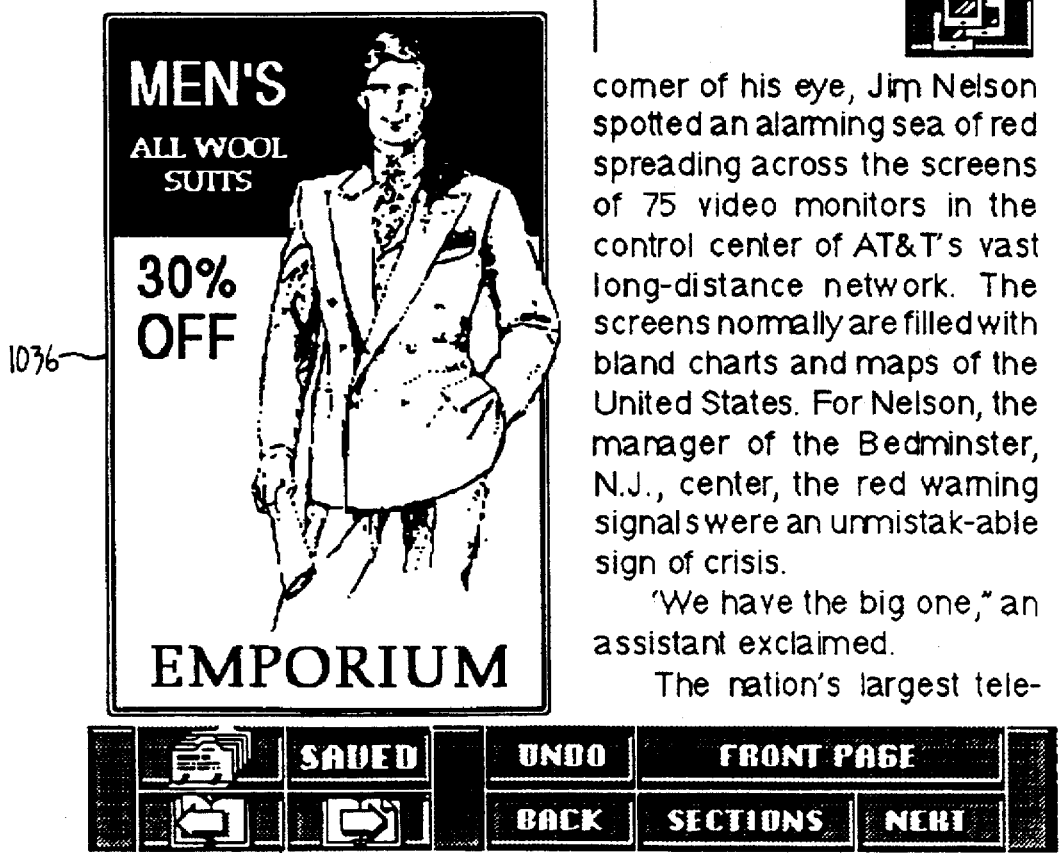

METHOD AND APPARATUS FOR PUBLICATION OF INFORMATION

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to the field of computer devices and especially computer devices for publishing information such as text and graphics. In one specific embodiment, the invention provides a method and device for publication of materials such as newspapers, magazines, and the like.

The classical system for publication of newspapers and magazines in paper form presents a number of difficulties. For example, the cost of the present methods of printing and distribution tend to be quite high. This high cost results from a number of factors including high and increasing labor costs, high material costs, and the like. It has been estimated that the cost of printing and delivering a newspaper is 50 to 60% of the cost of providing a newspaper to the consumer.

Additional problems result from the environmental and monetary cost of disposing of used paper products such as newspapers. Approximately 1000 acres of trees are estimated to have been cut for the printing of a single Sunday edition of the United State's newspapers. Recycling has been widely adopted, but about 66% of all newspapers still continue to be deposited in landfills. Even when recycling has been adopted, it results in a degree of inconvenience to the consumer, and requires the construction of the infrastructure to implement the recycling program at substantial cost. The volume of waste generated by the newspaper industry is particularly disturbing when one considers that the average reader actually reads only 10 to 20% of a newspaper.

Other problems with conventional newspapers also exist. For example, ink rub-off is frequently a problem which has not been overcome. Further, advertisement in a newspaper is relatively inefficient from the advertiser's viewpoint since it is relatively untargeted. Still further, timeliness of newspaper delivery is a problem since the content for a 6:00 A.M. newspaper is typically set in large part by 8:00 P.M. the preceding day. These time restraints also create language barriers. Although a newspaper could quickly be translated into various languages, the time for actually printing the newspaper in various languages often makes timely distribution in multiple languages a practical impossibility.

Solutions have been proposed to the above-mentioned problems. For example, many commercial database services such as Dialog, Lexis/Nexis, and the like, provide various newspaper and wire services, as well as a variety of periodicals, typically over telephone communication lines. These systems also present certain difficulties, however. Important among these problems are the restraints imposed by the speed with which information may be conveyed to the user over telephone lines. The data transmission speed of such systems is often only 1200 to 9600 baud, and speeds above these rates are very difficult to implement over the conventional telephone system. This slow speed presents a number of problems. For example, the transmission of image data becomes impossible within practical terms. Further, users are unlikely to use such systems for day-to-day news gathering since the slow speed of the device results in the inability to "leaf through" a newspaper in a comfortable manner. Further, the user interfaces for such systems are typically designed in large part with conventional computer users in mind and are not amenable to usage by the average newspaper reader.

Other systems have also been proposed. For example, Fidler, "Newspaper Design 2000 and Beyond," American Press Institute J. Montgomery Curtis Memorial Seminar, September 1988, discusses an apocryphal system for distributing news. The system is described as being plugged into a news outlet next to a television. The user is putatively able to select from a variety of newspapers, and the system uses a tactile screen. The system is preset to flag any stories that contain references to a variety of subjects and includes graphical displays. Stories can be saved in a personal memory. While expressing a strong desire and need for such systems, Fidler does not provide a practical means for implementing the system described therein.

Other solutions have also been proposed. For example, Scarr, U.K. Patent Application 2 185 361, discusses an "Intelligence Handling System" which is another largely apocryphal publication system. According to the system discussed by Scarr, incoming information is received during off peak hours at rates lower than the rates needed for playback. It is proposed to use the system for music, written materials such as newspapers, and the like. A transcoder is utilized which putatively serves as an interface to one of several media such as conventional telephone, broadband, or the like. Information is stored on, for example, an optical disc for later use. Again several problems remain, however. For example, while the system is proposed, Scarr provides little information regarding how the system would actually be implemented. Furthermore, while Scarr discusses in passing the use of broadband transmission, there is no suggestion how such systems could be used to deliver a variety of possible subscriptions. Further, there is no disclosure regarding an effective display system, a system using existing distribution channels, or the like.

From the above it is seen that an improved method and system for distributing information is desired, particularly news which is now commonly distributed in the form of newspapers.

SUMMARY OF THE INVENTION

An improved method and device for publication of materials such as newspapers is provided by virtue of the present invention. The system provides for a portable viewing screen, which is operably coupled to a microprocessor and sufficient memory for storage of one or more editions of periodicals such as newspapers. It is to be understood that by the term "periodical" it is intended to mean a publication that is distributed on a regular and frequent basis to convey information of a select type. Most common among periodicals to be distributed with the present method are "newspapers" which are periodicals generated on a daily or other high-frequency basis to distribute news to the public.

Text information is stored in, for example, ASCII form while images are stored as bitmaps. The memory/display unit is normally mounted in a base through which information is transmitted to the memory for storage, but the screen is removable from the base for viewing since the necessary information for reading a full edition of a periodical is stored in the memory in the display unit. The base also serves as a connection for recharging batteries in the memory/display unit.

Information is transmitted to the system over broadband media and, in a preferred embodiment, over a conventional cable television system in which one channel is entirely or partially dedicated to newspaper transmission. According to one aspect of the invention, the channel transmits a common signal to a large number of subscribers. The common signal contains the necessary data for presentation of a number of newspapers. The viewing device, however, permits the user to view only those newspapers to which the user has subscribed. Hence, according to preferred embodiments, only selected newspapers are stored in the memory, or the user is given access to only a portion of the newspapers stored in the memory.

According to one aspect of the invention, a high resolution touch screen is provided as a user interface. According to one preferred embodiment of the invention, the screen is a reflected light screen using surface acoustic waves for detection of input by the user.

Accordingly, in one embodiment the invention provides a publication system. The publication system includes means at a publisher's facility for producing a periodical publication in digital form; means for transmitting said periodical publication in digital form over a satellite link to a cable television service provider; a memory and display system at a subscriber location for receiving and storing the publication from said cable television service provider and including a display for visually displaying the periodical.

According to another aspect, the invention includes a periodical memory and display system for viewing periodicals. The system includes a base, said base coupled to a broadband transmission line; and a memory and display system for inputting data representative of a periodical over said broadband transmission line, the memory display system removably mounted and electrically coupled to said base, the memory and display system comprising: central processing means for inputting data and displaying the periodical on the display means; and memory means for storing substantially all of the periodical in digital form.

A further understanding of the nature and advantages of the inventions herein may be realized by reference to the remaining portions of the specification and the attached drawings.

BRIEF DESCRIPTION OF THE DRAWINGS

FIGS. 6a to 6b illustrate operation of the system from the user perspective, while FIGS. 6c to 6d illustrate operation of the software in the device;

FIGS. 9a to 9e are flow charts illustrating the software used in the demonstration system; and FIGS. 10a to 10k (© Copyright 1991, Raychem Corporation, all rights reserved) illustrate the sequence of screens viewed by a user in a typical user session.

DESCRIPTION OF THE PREFERRED EMBODIMENTS

CONTENTS

I. General
II. System Details: Data Transmission
   A. Newspaper Facilities
   B. Cable Television Facilities
III. System Details: User Facilities
   A. Hardware Description
   B. Software Description
IV. Exemplary Applications
V. Example User Sessions
   A. Hardware and Software Used In Demonstration
   B. Screen Sequences During Typical User Sessions

I. General

The present invention provides a system and devices for publication of newspapers, books, catalogs, documents, maps, and the like, using an electronic display which preserves the convenience of printed material, but which has the advantages of a computer display. It will be understood that while the disclosure herein relates primarily to the publication of periodicals such as newspapers by way of example, the invention is not so limited and will find a variety of additional uses such as in the publication of magazines, books, catalogs, yellow pages, maps, coupons and the like.

The approach described herein largely eliminates the need for paper, ink, postage, and delivery of newspapers. Since 50 to 60% of the cost of newspapers are for paper, ink, printing, postage, and delivery, the cost of publication can be radically reduced. Additionally, because the system is paper-free, more information can be delivered more quickly than through the use of conventional publication systems.

The invention provides for the use of a combination of a cable television (CATV) network to distribute the information and a portable subscriber memory/display unit. The subscriber display unit (preferably uses a reflected light display) illuminated by ambient light for power conservation with a surface acoustic wave touch screen interface. Liquid crystal displays are illustrated in U.S. Pat. No. 4,435,047 (Ferguson) incorporated herein by reference for all purposes. Surface acoustic wave touch screen are illustrated in U.S. Pat. No. 4,880,665 (Adler et al.), also incorporated herein by reference for all purposes. The interface is user friendly, easy to read, and uses low power as compared to lighted systems, while remaining portable.

Figure 1:
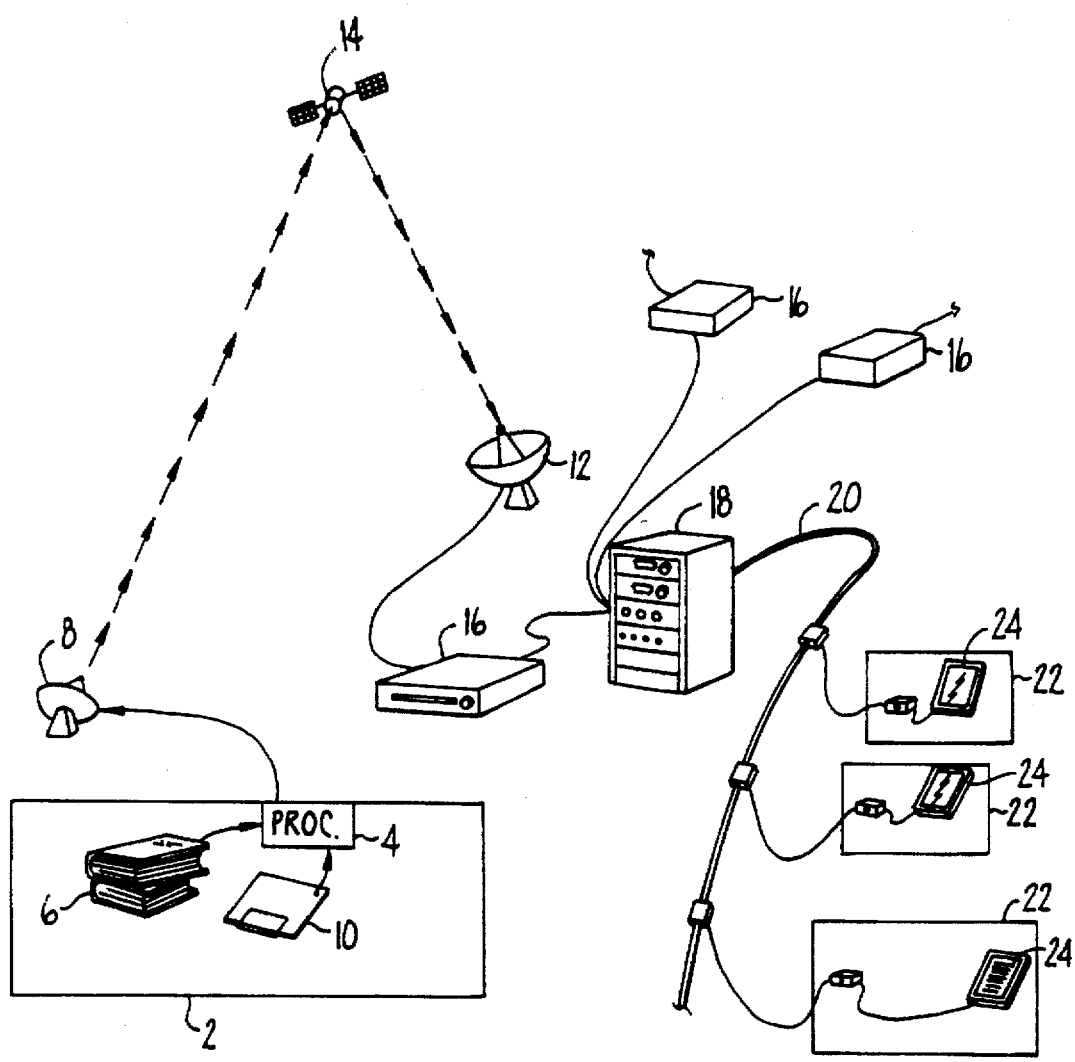
FIG. 1 is an overall drawing illustrating a newspaper publishing system.

FIG. 1 is an overall block diagram illustrating the system disclosed herein according to one aspect of the invention. Data are transmitted over the system from a newspaper publication facility 2. The newspaper publication facility is provided with a data processing facility 4 that transmits newspaper data 6 to a satellite transmitting facility 8 using applications software 10.

The transmitted data are provided to a cable television satellite receiving station 12 by way of satellite link 14. Signal generators 16 are coupled to the satellite link and provide appropriate signals to a CATV network transmission facility 18. As shown in FIG. 1, a plurality of signals will be provided to the CATV transmission facility, such signals representative of, for example, several different newspapers, several language versions of a single newspaper, or the like. Network transmission facility 18 transmits newspaper signals over a CATV line 20 to a plurality of subscriber facilities 22.

Each subscriber facility is provided with a memory/display unit 24 which is used to store and display one or more newspapers for a subscriber's use. The memory/display unit will generally be provided with a base in which a viewing screen (otherwise referred to herein as a memory/display unit) is removably mounted. The base is hard-wired to the cable television system. When the user desires to read a newspaper, data are downloaded from the cable television system, through the base, and into the viewing screen where the data are stored in, for example, a 1M DRAM or larger. The user may then remove the memory/display from the base and view the newspaper at a location remote from the base.

The system herein preferably provides for sufficient memory that several newspapers or several versions of a single newspaper are transmitted over the cable system. Accordingly, it is not necessary for the CATV provider to transmit "custom" signals to a particular user. The subscriber memory/display unit is appropriately programmed to either a) only accept those papers into memory for which the user has subscribed; or b) accept all of the data transmitted by the CATV service, but only display newspapers for which the user has bought a subscription. In addition, for a given newspaper, the memory/display unit will in some embodiments only accept or display selected portions of the newspaper for a given user. For example, based on the zip code or other identifying information of the subscriber, only certain advertisements may be displayed or accessible. The user may also customize the memory/display such that only selected sections are displayed such as the front section, sports section, and the like.

It is important in periodical distribution to ensure that only paying subscribers will have access to the periodicals. Accordingly, in one embodiment of the invention the system performs a check before providing user access to ensure that the user is a paying subscriber. The newspaper distribution service precedes the broadcast of the newspaper over the broadband media with a series of numbers or other characters indicative of a list of or associated with paying subscribers. Such information will be region-specific according to one embodiment of the invention, such as cable service provider-specific, to reduce the number of authorization numbers which must be distributed. Each memory/display unit is provided with sufficient read-only memory, for example, to store at least identifying data associated with that particular memory/display unit. The data indicative of the authorized users are compared to the identifying data in the memory/display unit and the user is provided access to the incoming data only when the data have adequate agreement.

Figure 2:
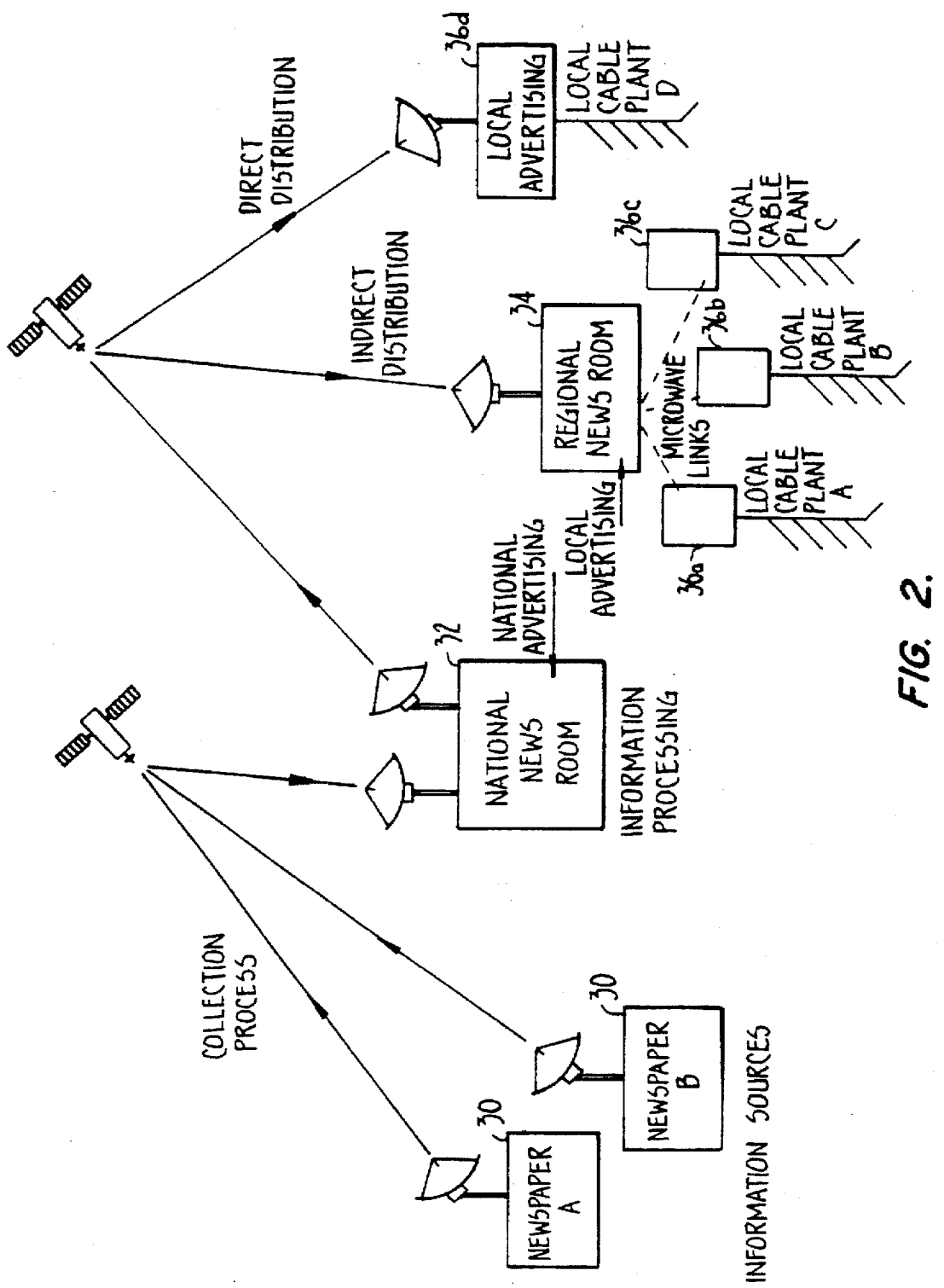
FIG. 2 illustrates the news distribution process.

FIG. 2 illustrates in greater detail the hardware and process by which information reaches the cable service provider. Information sources 30, such as local newspapers, transmit various news items to satellites for collection at a national news room 32. This information is supplemented with various national advertising at the national news room. The combined information from the national news room is transmitted by satellite via one of two paths. According to a first path, the combined news information is transmitted to a regional news room 34 which supplements the combined information with local advertising or news. This localized signal is then transmitted via, for example, microwave link to local cable plants 36a, b, and c. According to a second path, the information is transmitted directly from the national news room via satellite to a local cable plant 36d, which optionally supplements the signal with local advertising.

Digital data transmission techniques for CATV lines are known in the art and described in, for example, Hideshima et al., "Digital Audio and Data Transmission System for CATV Line," incorporated by reference herein for all purposes.

II. System Details: User Facilities
   A. Hardware Description

Figure 3:
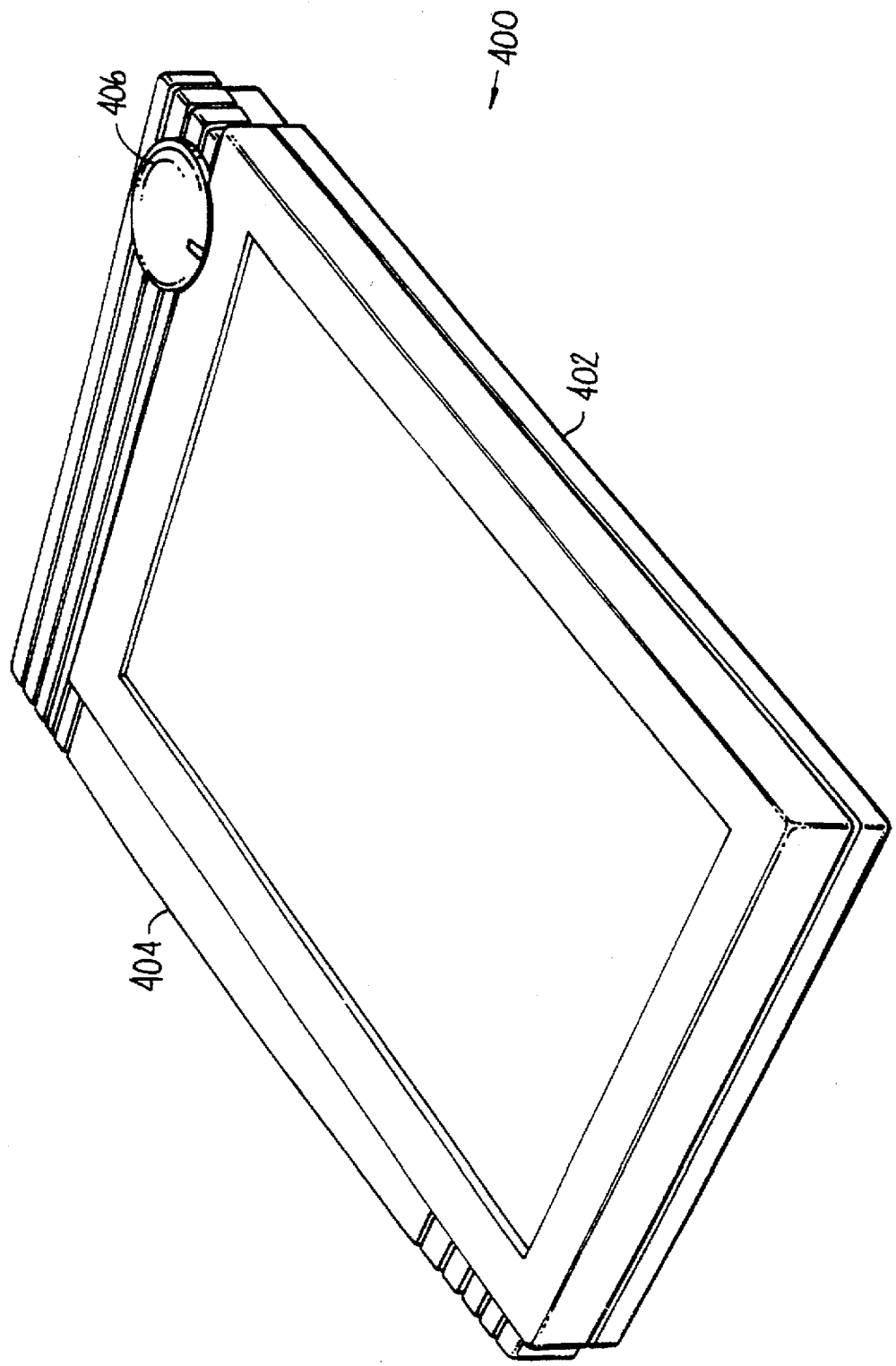
FIG. 3 illustrates a subscriber memory/display assembly.
Figures 4A, 4B, 4C:
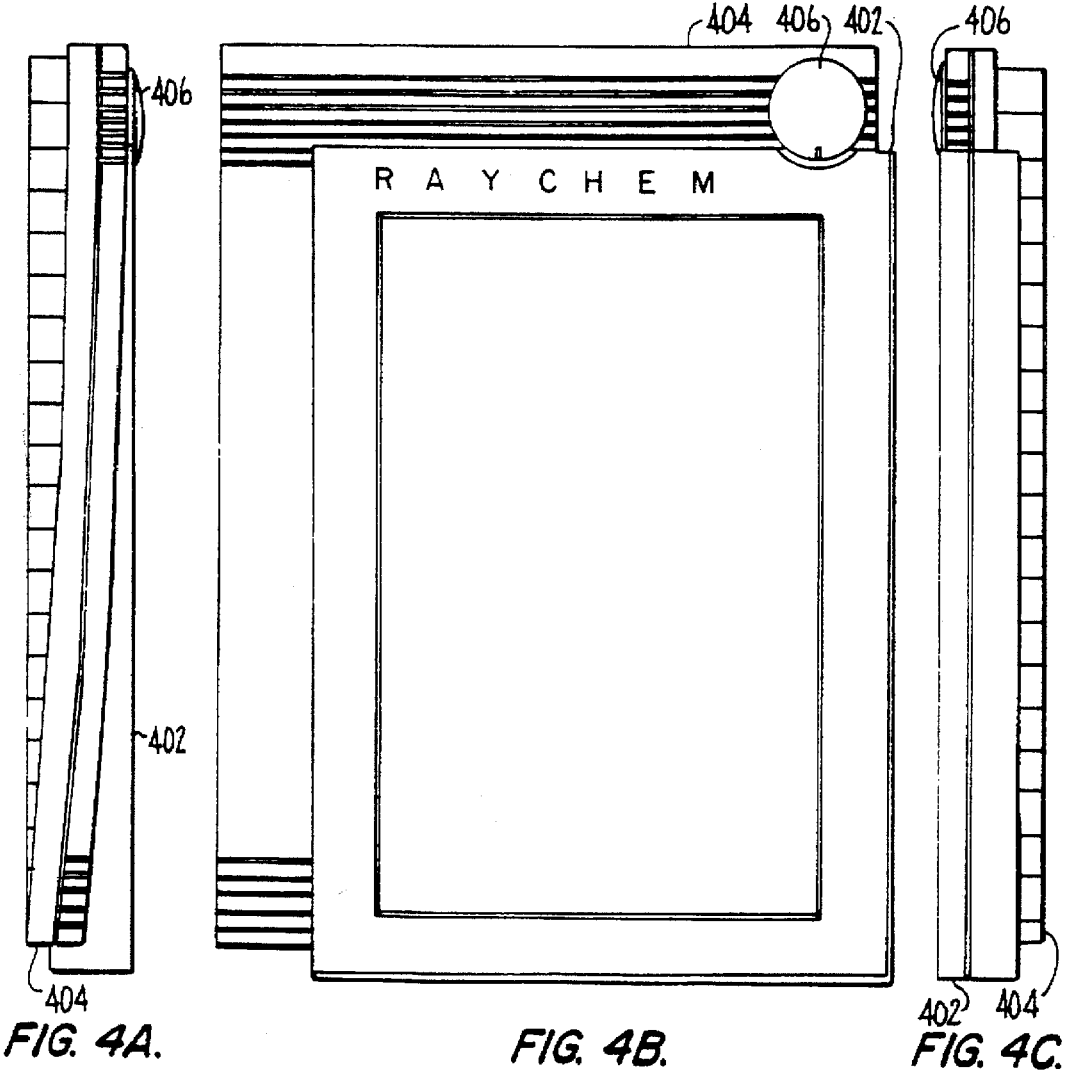
FIGS. 4a to 4e illustrate the mechanical features of a subscriber memory/display assembly.

FIG. 3 is an isometric view of a user memory/display system, 400. While FIG. 4a is a side view of the screen from the left side, FIG. 4b is a top view, FIG. 4c is a view from the right side. As shown, the memory/display unit includes a body with a first generally rectangular portion 402 and a second, displaced rectangular portion partially extending from the first portion. The second portion is in the form of a rectangular box which intersects the rectangular rectangular box formed by the first portion. The second portion provides the appearance of having a relatively thin cross section, while providing a reasonably thick region in the center for placement of larger components. As shown, the device requires only a single dial 406 which may be used, for example, as an on/off/contrast button, or this button may be eliminated entirely or serve merely as a decorative item over a loudspeaker. Optionally, the display may be packaged in the non-breakable exterior pod or shell.

FIGS. 4f and 4g are cross-sectional views and of a screen display according to various embodiments of the invention. According to a preferred embodiment, the display is a liquid crystal display, such as the display described in U.S. Pat. No. 4,435,047 ('047), incorporated herein by reference for all purposes. Such displays have the advantages of being twice as bright as conventional LCD displays, while having quick response times, and low power usage.

According to preferred embodiments, the touch screen is a surface acoustic wave touch screen such as the one disclosed in U.S. Pat. No. 4,880,665 ('665), incorporated herein by reference for all purposes. The combination of the NCAP display with the surface acoustic wave touch screen provides a substantially brighter display than conventional touch screen/display combinations since fewer layers of glass, plastics, or other materials are required than in most conventional touch screen displays. Moreover, the speed of response is sufficient to allow for graphics displays which include motion.

Figure 4D:
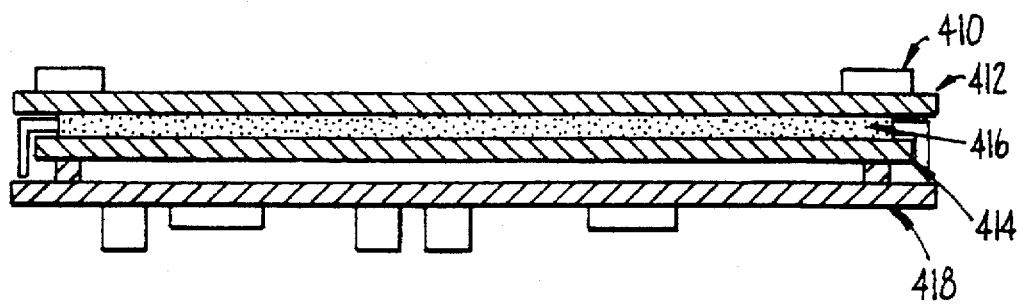
Figure 4E:
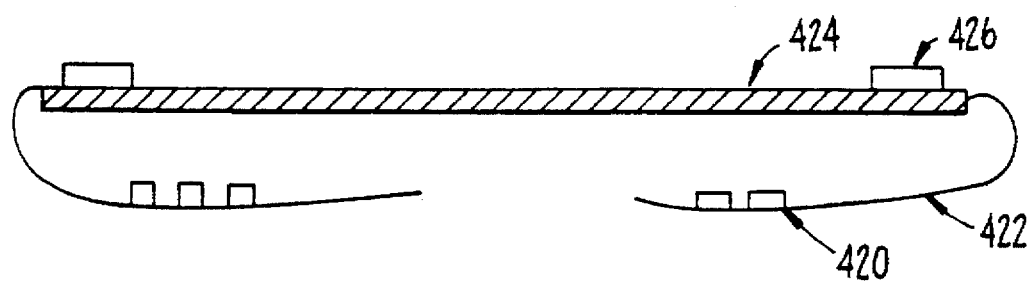

FIG. 4d illustrates one embodiment of the touch screen which provides for surface acoustic wave transducers 410 mounted on a touch screen surface 412. Between an LCD screen 414 and the touch screen 412, a gel layer 416 is provided which optically couples the SAW screens and the LCD. LCD controller board 418 provides appropriate driving inputs to the LCD screen in accordance with the description in U.S. Pat. No. 4,435,047. FIG. 4e illustrates another, preferred, embodiment of the invention in which drivers 420 are connected by way of flexprint cable 422 to a display 424 such as the one described in '047 having surface acoustic wave transducers 426 mounted thereon.

As described in '047, the light scattering display system (otherwise referred to herein as reflective light display) provides for a clear display with low power dissipation, particularly when an illumination system is not utilized. Such displays generally operate by allowing light to enter or not enter for subsequent reflection off of a reflective material depending upon whether an electric field is applied by electrodes. Hence, light is either reflected or not reflected off of the back of the display depending on the voltage applied to the crystals. The liquid crystals generally take the form of encapsulated balls or the like which are deposited or otherwise applied to the electrodes. Preferably, the liquid crystal molecules are of the nematic type, and, preferably, have a pleochroic dye dissolved therein. Such crystals will generally absorb or block light when no field is applied, but permit light to be transmitted in increasing amounts when a field is applied. The liquid crystals preferably have a positive dielectric anisotropy and are encased in a material which indices a distorted alignment in the crystals. The encapsulating medium preferably has a dielectric constant at least as great as the lower dielectric constant of the liquid crystal material and preferably has substantially the same index of refraction.

Figure 5:
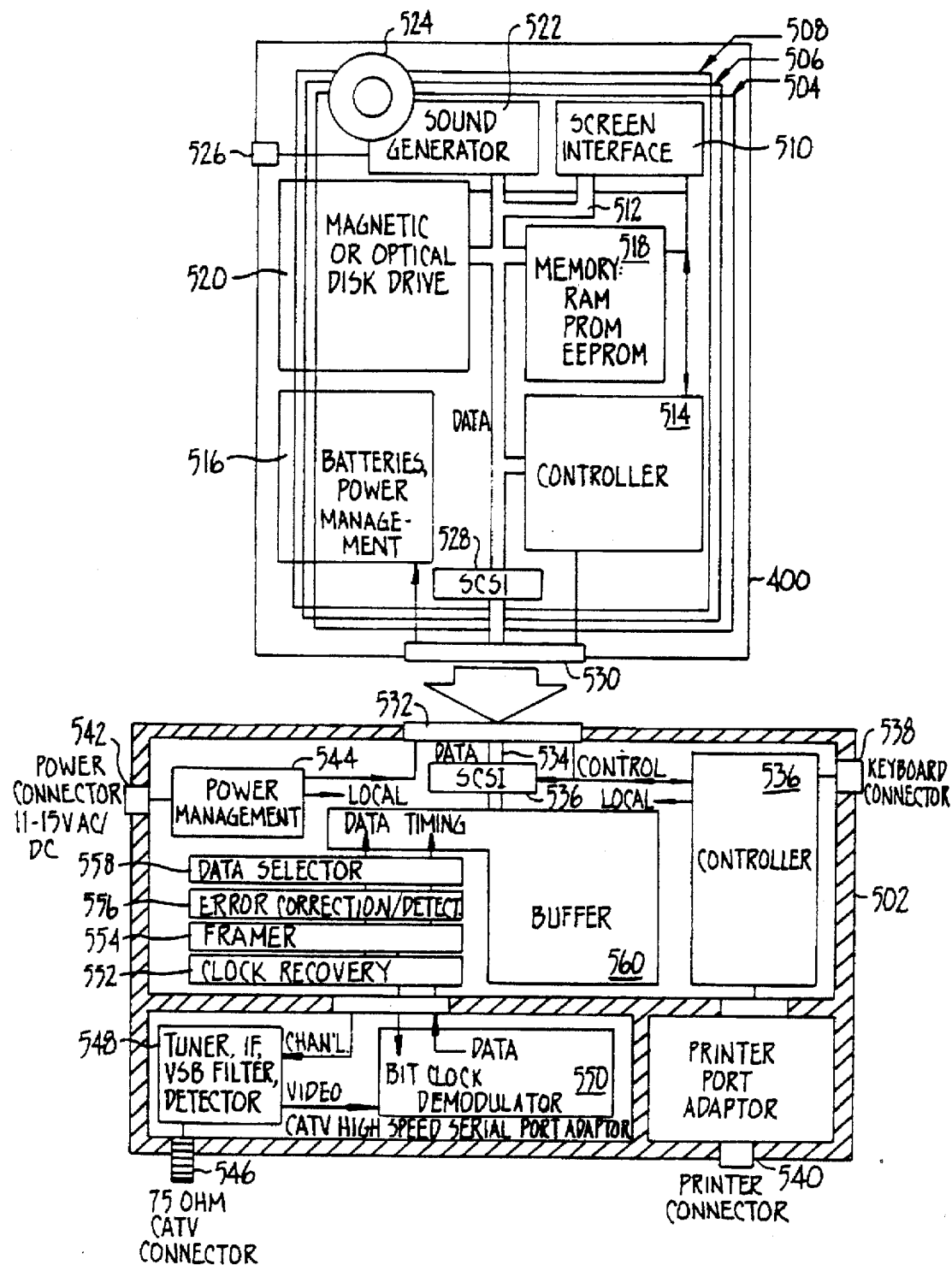
FIG. 5 provides an electrical block diagram of a subscriber memory/display assembly.

FIG. 5 is a block diagram illustrating the electronics components of the memory/display system and its associated base. The memory/display unit includes the portable body 400 which is removably mounted in a base 502. On the surface of the memory display unit, the touchscreen faces the user and includes a touchscreen layer 504, a display layer 506, and electronics layer 508. The screen is driven by a screen interface 510 which communicates with the rest of the system by way of data bus 512. The system operates under the direction of a controller 514 such as a conventional microprocessor such as a 68HC11 made by Motorola. Power is provided to the system by way of a battery/power management system 516 of the type used in many conventional small computer systems. Data are input to and stored upon semiconductor memory 518 and processed by the microprocessor and screen interface for display on the screen. In some embodiments both dynamic or static, and ROM memory are provided in the semiconductor memory section 518. The dynamic memory (DRAM) or static memory (SRAM) will be used primarily for storage of data related to the particular periodical to be displayed, while the ROM (such as PROM or EEPROM) is used for storage of a control program for operation of the microprocessor. According to most preferred embodiments of the invention, the DRAM has a size of between about 8 and 16 megabytes, while the ROM will have a size of between about 512K and 1 Meg. Obviously, as the technology advances, larger and faster memory chips will be available to further enhance the features available in the system. Edge connector 530 provides a removable mechanical connection between the memory/display unit bus and the base via a SCSI port 528. Additional, direct connections may be provided between the controller and the screen interface, the controller and the sound generator, the controller and the edge connector, and between the edge connector and the battery/power management unit.

Optionally, a magnetic or optical disk drive 520 is provided for storage of user-selected articles for later display or printing. According to some aspects of the invention, the drive may serve as a memory buffer for downloading of information to the DRAM. In some embodiments a sound generator 522, loudspeaker 524, and headphone jack 526 are provided so that the system may provide various audible responses in addition to the visual representation of the periodical in display.

The base is provided with edge connector 532 for connection to the edge connector 530. Communications within the base also take advantage of a small computer system bus 534 which interfaces with the edge connector via a SCSI port 536. Like the memory/display unit, operations in the base are conducted under the control of a microprocessor 536. An optional keyboard connector 538 and printer connector 540 are provided for connection to a conventional computer keyboard and printer, respectively. Power is supplied to the system with a power connector 542 which in one embodiment provides conventional AC or DC power. If AC power is provided, appropriate conversion is required in the power management unit 544. Data are input via a 75 ohm CATV connector 546, or similar connector for connection to a broadband media such as cable television.

Data are input from the CATV connector to a tuner/IF (intermediate frequency)/VSB (Vestigal Sideband Modulation) filter/detector system 548 such as a TPS7 made by Mitsumi Electric Co. Ltd. Outgoing video data from the system 548 are transmitted over a CATV high speed serial port adaptor to a demodulator 550. Data from the demodulator are transmitted for clock recovery system 552, framing system 554, error correction/detection system 556, and data selection system 558. Data and timing information are temporarily stored when necessary in buffer 560 for transmission to the memory/display unit.

B. Software Description

The electronic newspaper system herein has several components—the memory/display unit, the base unit, the Local News Diributors, Regional Newsrooms, and a National Newsroom. One or more memory/display (M/D) units and a single base unit are provided for each subscriber. The system uses an integrated high contrast display and touchscreen which serves as a portable news screen. One or more M/D units can be assigned to a base unit which is attached to an individual user's TV cable; it captures and stores information which is broadcast over the cable linke intended for that unit.

Content is produced in the national and regional newsrooms. The national newsroom produces content for national and international newspapers, and regional newsrooms provide production facilities for local news and advertisements. The national content is downloaded to the regional newsrooms via satellite. Local news distributors reside at the cable TV headends; they receive content from the Regional Newsroom and broadcast it over the cable network for pickup by the individual base units. The local distributors preferably have no production facilities.

The function of the M/D unit is to present the information downloaded from the base unit to the user in an appropriate format. As part of presenting the information to the user, the M/D unit allows the user to customize the presentation of the information by allowing zooming, pans, scrolling, searches, and reorganization of the data. Performance of these functions requires the following functions:

1. Hardware Control. Firmware provides control of M/D unit hardware: the display, touchscreen, memory, etc.

2. Maintenance. Firmware provides for verification of its sanity and verification of the operability of the hardware. The M/D unit informs the user of any problems and gives instructions for appropriate action by the user.

3. User Interface. Ideally, the information that is loaded into the M/D unit information or a program that tells the M/D unit how to operate on the dta that is downloaded as well as the data itself. This allows the M/D unit to adapt to different types of information and new features as required in the future. There is a resident user interface that allows the user to interact with the unit in the absence of a more sophsticated program. This software allows the user to perform diagnostic tests.

4. M/D Unit Database. This software allows the user to customize interaction with the M/D unit. It is the storage and implementation of data regarding user preferences, such as order of presentation, pruning of unwanted information, etc.

5. Command Interpreter. The command interpreter software allows the M/D unit to respond to intelligent data. Intelligent data includes direction as to how to operate on the data as well as the data itself. This intelligent data may include formatting and action information and code to be executed at a specified time.

6. Expandable Code. The M/D Unit's main loop of code has the capability to grow. Code can be downloaded to the M/D Unit with instructions to execute the code with each pass through the main loop. When this "hook" in the main loop is assigned to the downloaded code, the M/D unit creates another "hook" available for more downloaded code. The M/D unit performs integrity checks on this downloaded code and, in case a problem arises, advises the user if the M/D unit should be returned to the Base Unit for refresh.

7. Built-In Features. This software includes simple user features that are always resident in the unit such as the ability to zoom, scroll, auto format, and search. The zoom/auto format feature is implemented using techniques such as adjusting the page margins, appending 'filler' articles or ads, proportional spacing of text, and implementing hyphenation rules. Basic features that are required of all units are included in this software.

8. Base Unit Interface. This software allows the M/D unit to detect the base unit personality type and to communicate with the base unit. The base unit may or may not have a microcontroller attached to the unit. If not, the M/D unit is able to execute the base unit's embedded firmware to perform base unit functions.

The function of the base unit is to capture and store targeted information broadcast over the CATV network. In addition, the captured information must be transferred to the M/D unit when it is attached to the base unit. To perform these functions, the base unit software or firmware includes the following modules:

1. Hardware Control. The firmware controls all base unit electronics including optional printer and hard disk.

2. News Room Interface. The software provides control for selecting and capturing data transmitted by the local news distributor. In doing this, the base unit firmware must conform to standard communication protocol including performing error detection and correction in firmware if necessary.

3. M/D Unit Interface. The base unit communicates with the M/D unit to provide transfer of data and commands captured from the CATV link. If there is no microcontroller in the base unit, the embedded firmware is executable by M/D unit control.

4. Maintenance. The base unit firmware provides for the execution of simple tests to verify its sanity and ability to operate.

5. Security. The base unit firmware responds to commands captured over the CATV link that modify its behavior. It limits the information the base unit and the individual M/D units attached to it can received based on subscription lists broadcast over the cable.

The local news distributor resides at the CATV headend and functions as a CATV controller for the M/D unit system cable channel. Software used to provide this function include:

1. News Room Interface. This software controls communications with the regional news room. It includes hardware control, protocol handling, verification and capturing of data transmitted from the regional news room.

2. Teletext Insertion. This module controls the insertion of the data received from the regional news room onto the cable channel. This includes insertion of the CATV link protocol and error detection information, header information for each frame, and a periodic time stamp frame with the latest versions of each newspaper.

News room software provides production facilities for the M/D unit content. Text and graphics from remote information providers are captured over a high-speed link. Animation, sound, and content modifications are added; and the content is compressed and transmitted. The national news room transmits content to the regional news rooms, and regional news rooms append local modified and compressed content before transmitting to local news distributors. Content modifications may include appending reference information based on key word searches of an extensive database. The news room software includes the following components:

1. Interface to Remote Information Providers. This includes interfacing to and providing protocol conversion for electronic versions of newspapers, magazines, and electronic databases.

2. Production Facilities. This software allows the operator to reformat, modify, and examine the content. Modifications include adding animation, still-graphics, sound, games, and additional text and pictures.

3. Data Conversion. The text, graphics, and commands to be sent to the M/D unit are compressed for transmission.

4. Maintenance. This module provides for local and remote diagnostics for verification of the operation of the M/D unit news system.

5. Interface to News Rooms. This software includes hardware control of the high speed interface to other News Rooms as well as communications protocol, and verification and capturing of data and commands.

6. Reference Database. This is an extensive database of text, graphics, sound, games, etc., which the software searches using keywords form the newspaper to append related in-depth information to the content.

Figure 6A:
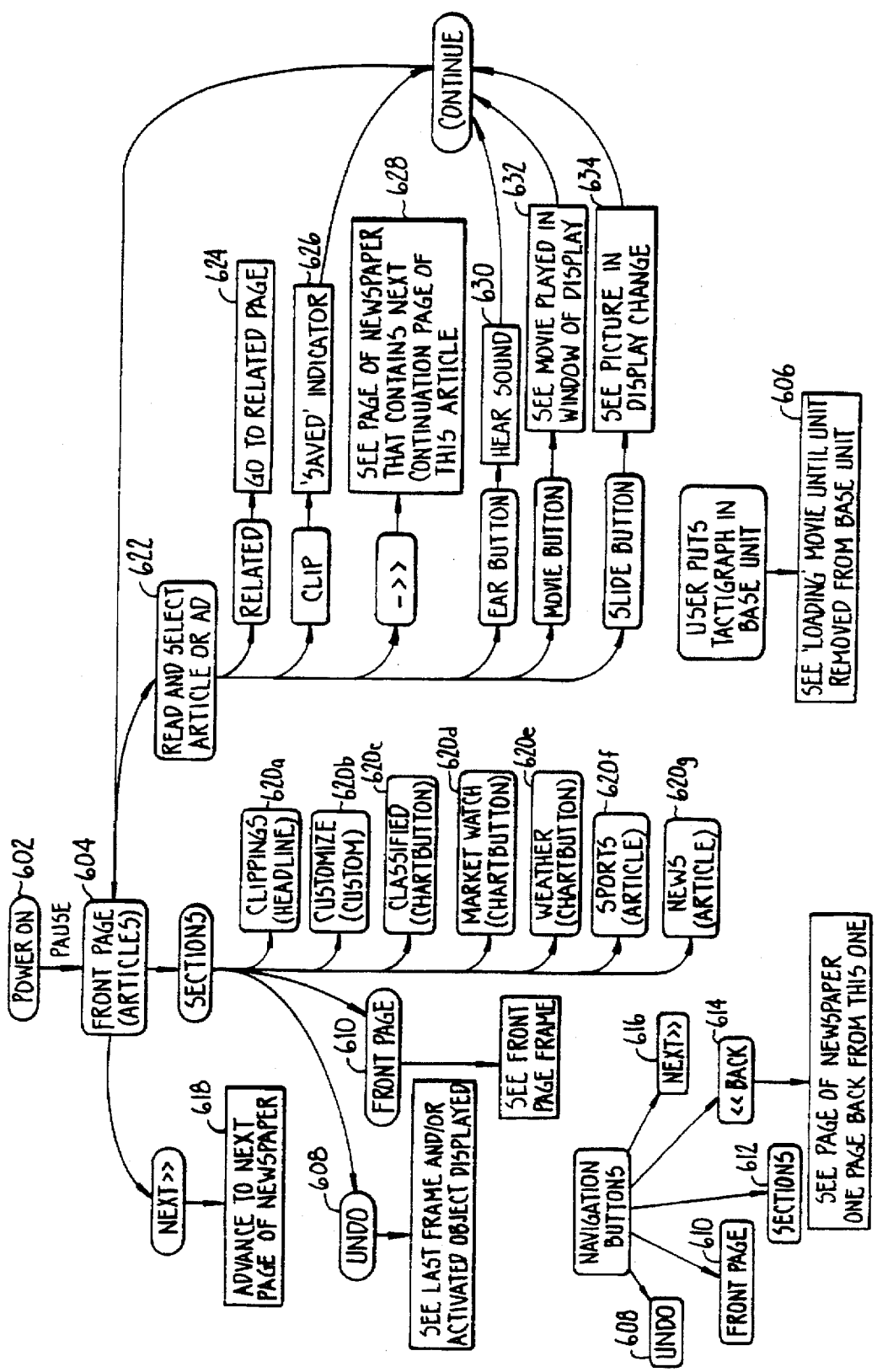
FIGS. 6a to 6d are flowcharts illustrating operation of the memory/display assembly. In particular.
Figure 6B:
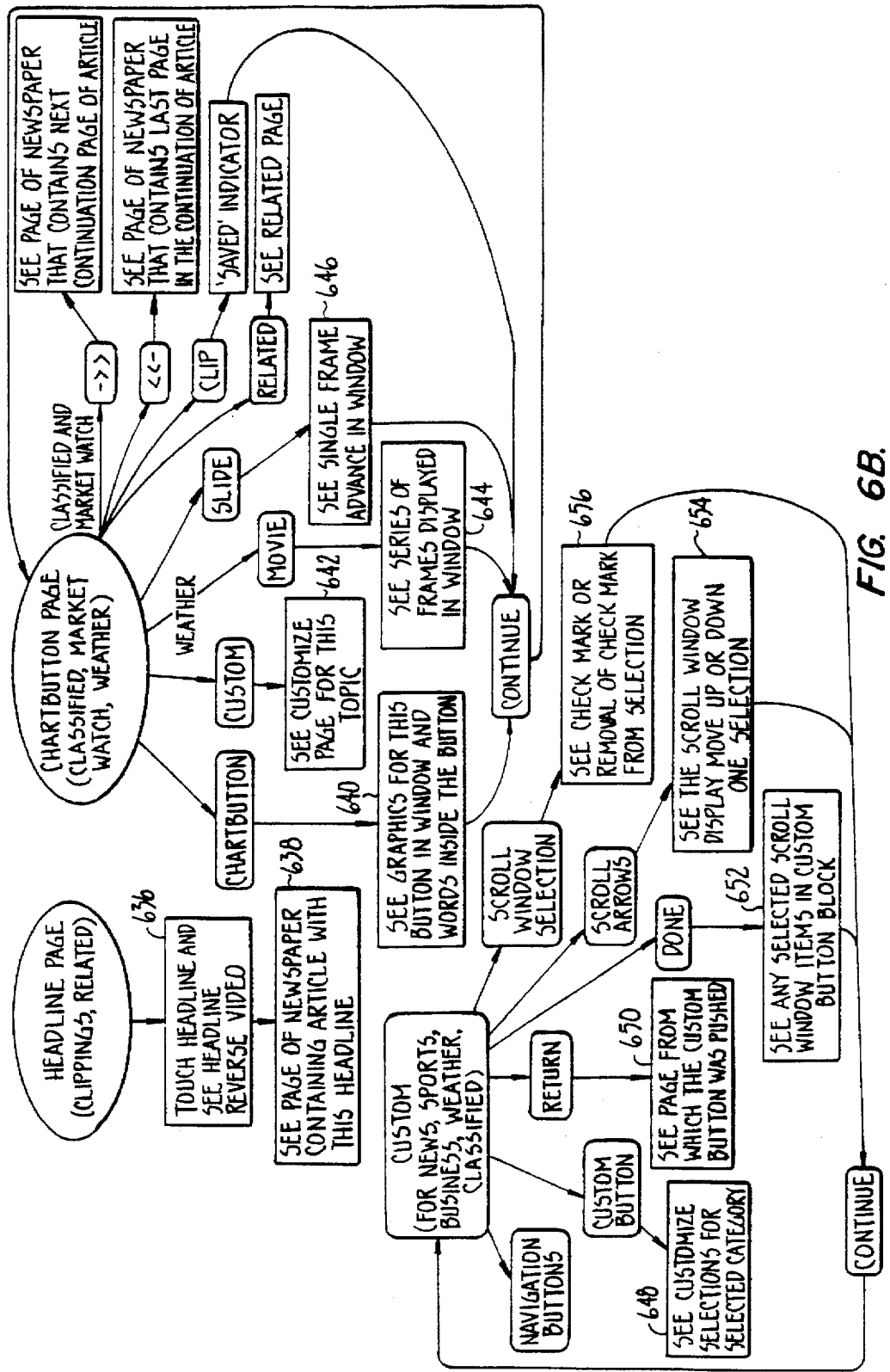
Figure 6C:
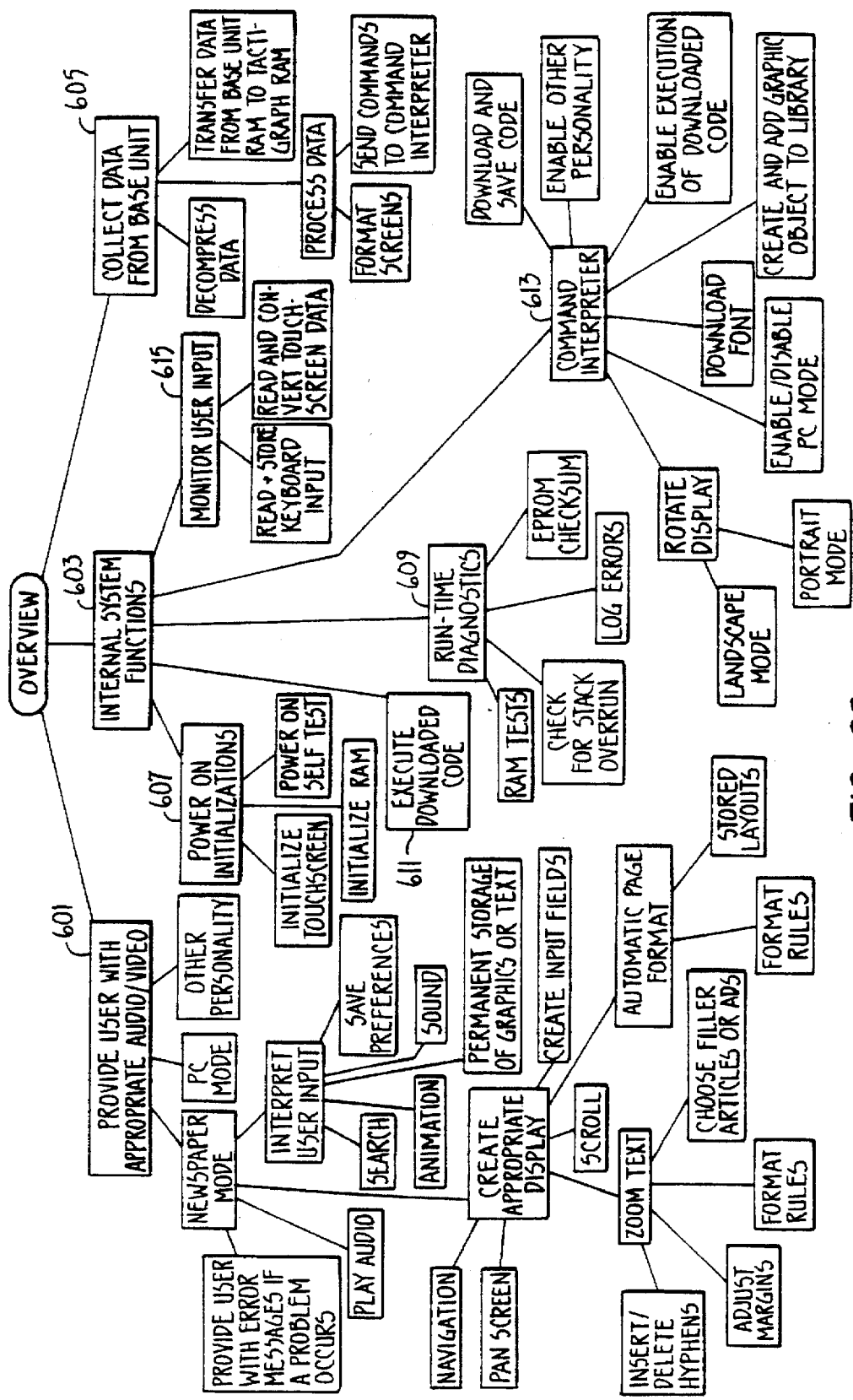
Figure 6D:
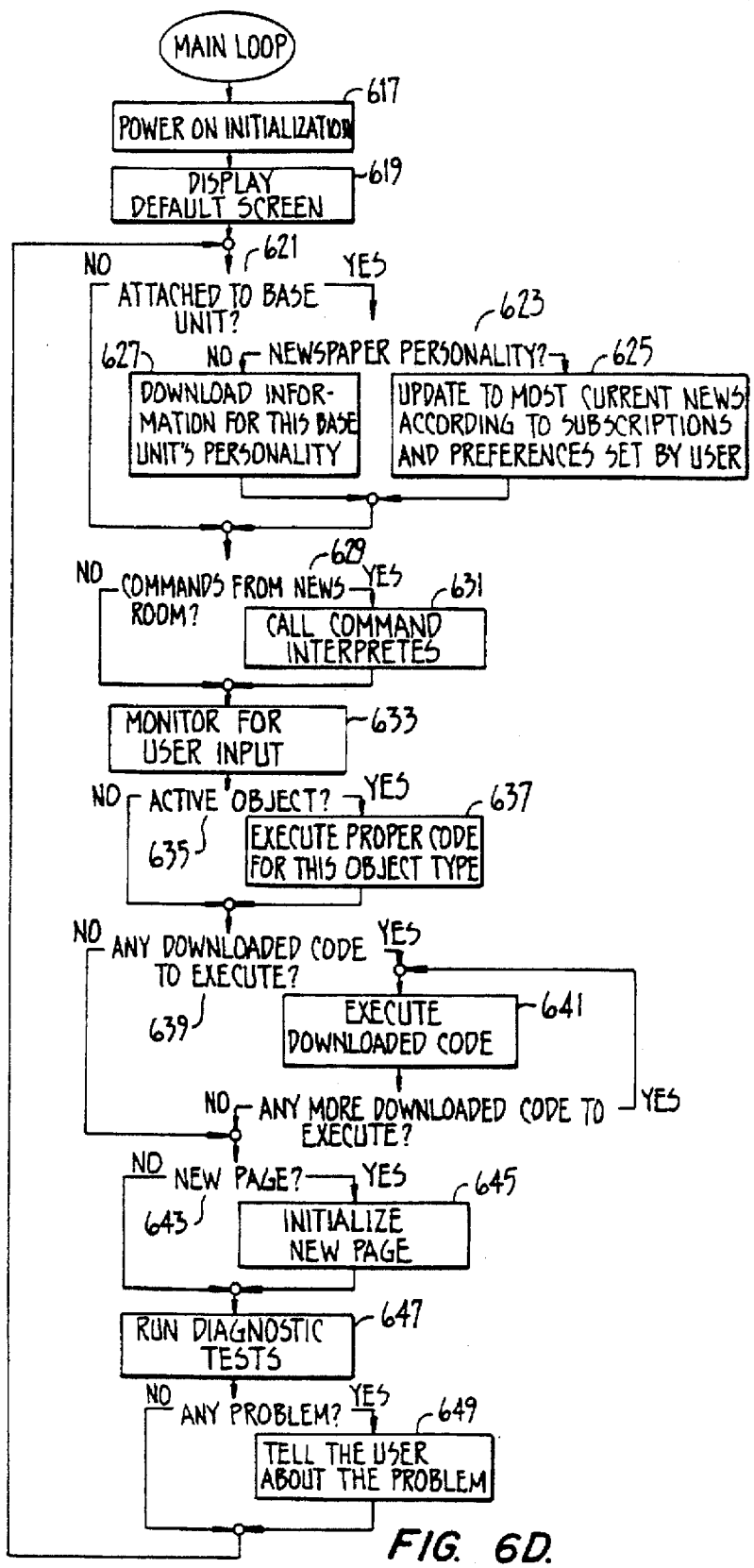

FIGS. 6a to 6d are flowcharts illustrating operation of the user memory/display assembly sofware. In particular, FIGS. 6a to 6b illustrate operation of the system from the user perspective, while FIGS. 6c to 6d illustrate the software in the device.

As shown in FIG. 6a, the system first performs a power-on sequence during which the user will observe a brief pause. In FIG. 6, ellipses indicate a "button" which is pushed. Parenthetical indicates a description of the functionality of the button. At step 604 the user will see the first page of the newspaper displayed. If the user has not installed the memory/display in the base, the system will, as shown in the bottom portion of FIG. 6a, display a "loading" movie during the time when news is being downloaded from the base, as shown in step 606.

As indicated in the bottom portion of FIG. 6a, the user may use one of several "navigation" buttons to control operation of the memory/display unit. In particular, the user may strike an "undo" button as shown in step 608, which reverses the immediately preceding operation of the user in the event that an error has been made. The user may also at any time strike the "front page" button as shown in step 610 to move the system back to display of the front page of the newspaper. The user may also at any time strike the "sections" button as shown in step 612 to move the screen to a display of the various sections available. The user may also use "back" and "next" buttons as shown in steps 614 and 616 to move the system to a next page or previous page.

If the user initiates the "next" operation from the front page or succeeding page of the newspaper, the screen will simply move to the next page of the paper, as shown in step 618. If the user presses the "section" button, the screen will display a decorated listing of the various sections of the paper 620a to 620g such as news, weather and sports, as well as a "clippings" section which allows the saving and later display of selected articles, and a "customize" setting which allows the user to screen advertising, articles, and the like. By pressing the region of the screen indicating one of the newspaper sections, the screen will move to that section of the newspaper. As in other operations, from the sections display, the user may press the front page button to return to the front page of the paper, or the undo button to return to a previous display.

The user may alternatively read and select an article or ad as shown at step 622 by pressing the region of the screen with the article. By pressing a "related" button on the display the user will be provided with a related section of the newspaper on the display as shown at step 624. By pressing a "clip" button on the display, the user may save the selected article for later use as shown in step 626. By pressing the "next" button, the screen will move to the next page of the paper containing that particular article as shown in step 628. By pressing an optional "ear" button, the screen will play an associated audio presentation as shown in step 630, and by pressing a "movie" button, the screen will display motion in, for example, an associated picture in the article as shown in step 632. An optional "slide" button in an article display will move the associated picture incrementally through time as shown in step 634.

FIG. 6b illustrates operation when the "headline" feature is accessed by the user. As shown, the user may touch a headline and see the headline story at step 636. The paper will also display the page of the newspaper containing the article with the selected headline at step 638. The headlines are used as reference handles for the articles. When the user is at the "clippings" or "related" pages, only the headlines appear. If the user touches a headline, it indicates that it has been selected by reversing its black/white pattern, and the user is then shown the page where the article is first seen in the paper. The user can then chose to follow that article, or anything else that appears interesting.

FIG. 6b also illustrates operation of the screen when the chartbutton is selected from, for example, the classified, market watch, or weather pages. If the chartbutton is selected by the user from the chartbutton page, the system will display graphics for the button in the window and words inside the button at step 640. If the user selects the custom button in the chartbutton page, the system will display the customize page for the particular topic in use at that time at step 642. If the user selects the movie button, the system displays a series of frames of graphics in that window at step 644. If the user uses the slide button, graphics are frame advanced in the window as the slide is moved at step 646. From the chartbutton page, the user may also use the next button, the previous button, the clip button or the related button, in which case the respective functions of these buttons, which have been described elsewhere, are carried out.

Operation of the custom feature is also illustrated in FIG. 6b, which may be accessed in the news, sports, business, weather, or classified sections. As usual, any of the navigation buttons may be used in the custom feature. If the custom button is pressed, the screen displays various custom features for that particular category at step 648. For example, if the user selects the custom button in the news display, the user may be able to select the order of display of the newspaper sections (for example, the sports section may be selected for the initial display) or the like. If the return button is struck, the system returns to the previous screen at step 650. If the user selects the done button on this screen, the system returns to the page from which the custom feature was entered and stores the new custom features at step 652. If the scroll arrows are selected, the system scrolls the display up or down one selection in step 654. If the scroll window button is used in the custom feature, the system adds or removes a check mark from the current selection in question at step 656.

FIG. 6c illustrates the overall architecture of exemplary software used in the memory/display unit. The software includes three primary modules, i.e., a module 601 for providing the user with appropriate audio/video information, a module 603 for controlling internal system functions, and a module 605 for collecting data from the base unit.

The module for internal system functions provides for power on initialization 607. Such initialization procedures will include initialization of the touch screen, initialization of the RAM, and a self test. The internal system functions will also include a module for run time diagnostics 609 including RAM tests, checking for stack overrun, logging of errors, and checking of an EEPROM checksum.

For normal operation of the system, the internal system functions will include software for execution of downloaded code, as shown in box 611, a command interpreter 613, and code 615 for monitoring of user input. The code for monitoring user input will include code for reading and storing keyboard input (when the optional keyboard is attached) and for reading and converting data entered on the touchscreen display. The command interpreter will include code for rotation of the display in either a landscape or portrait mode, for enabling various modes of operation such as a PC mode, for downloading fonts, for creating and adding graphics objects to a stored library, and for enabling execution of downloaded code.

Operation of the software for the memory/display unit is shown in FIG. 6d. At step 617 a variety of initialization procedures are conducted of the type commonly used by those of skill in the art. At step 619 an initial default screen is displayed by the system. A first loop then begins in which at step 621 the system determines if the unit is attached to the base unit. If so, at step 623 the system determines if the system is set for a newspaper personality (as opposed to a PC personality or the like). If so, at step 625 the system updates the memory to contain the most current news according to preferences set by the user. If the unit is not set for the newspaper personality, the unit then downloads information from memory for performance of code according to the designated personality type at step 627. The first loop is then completed.

After completion of the first loop, the system checks in a second loop to see if there are any new commands embedded in the data from the newsroom at step 629. If so, at step 631 the system calls a command interpreter. After calling the command interpreter, or if there are no commands from the newsroom, the second loop is complete.

The system then begins to monitor for user input to the screen at step 633. At step 635, when there is an active object the system executes the appropriate code for the particular object type requested at step 637. An object is active if the user has touched a displayed representation of the object. For instance, if the user touches a headline on the display, the encapsulated code module associated with that headline object is invoked. The object may be inactivated upon a return of the object code to the main loop, or the code may return to the main loop and the object remain active. This happens, for instance, when the user selects an article to read. The object code will be invoked to place an active indicator at the top of the article then return to the main loop until the user is ready to proceed. Every time through the main loop, the active object code will be called until the user de-selects the article. If there is not an active object, or upon completion, the system determines if there is any downloaded code to execute at step 639 and, if so, at step 641 executes the downloaded code embedded in the intelligent data, continuously checking for additional downloaded code. If there is no downloaded code for execution, or upon completion thereof, the system checks to determine if a new page is to be displayed at step 643. If so, the system initializes the new page at step 645. Upon completion thereof, the system performs a run diagnostic test at step 647 and if any problems are noted, at step 649 the user is advised. The system then restarts the main loop.

IV. Exemplary Applications

Figure 7A:
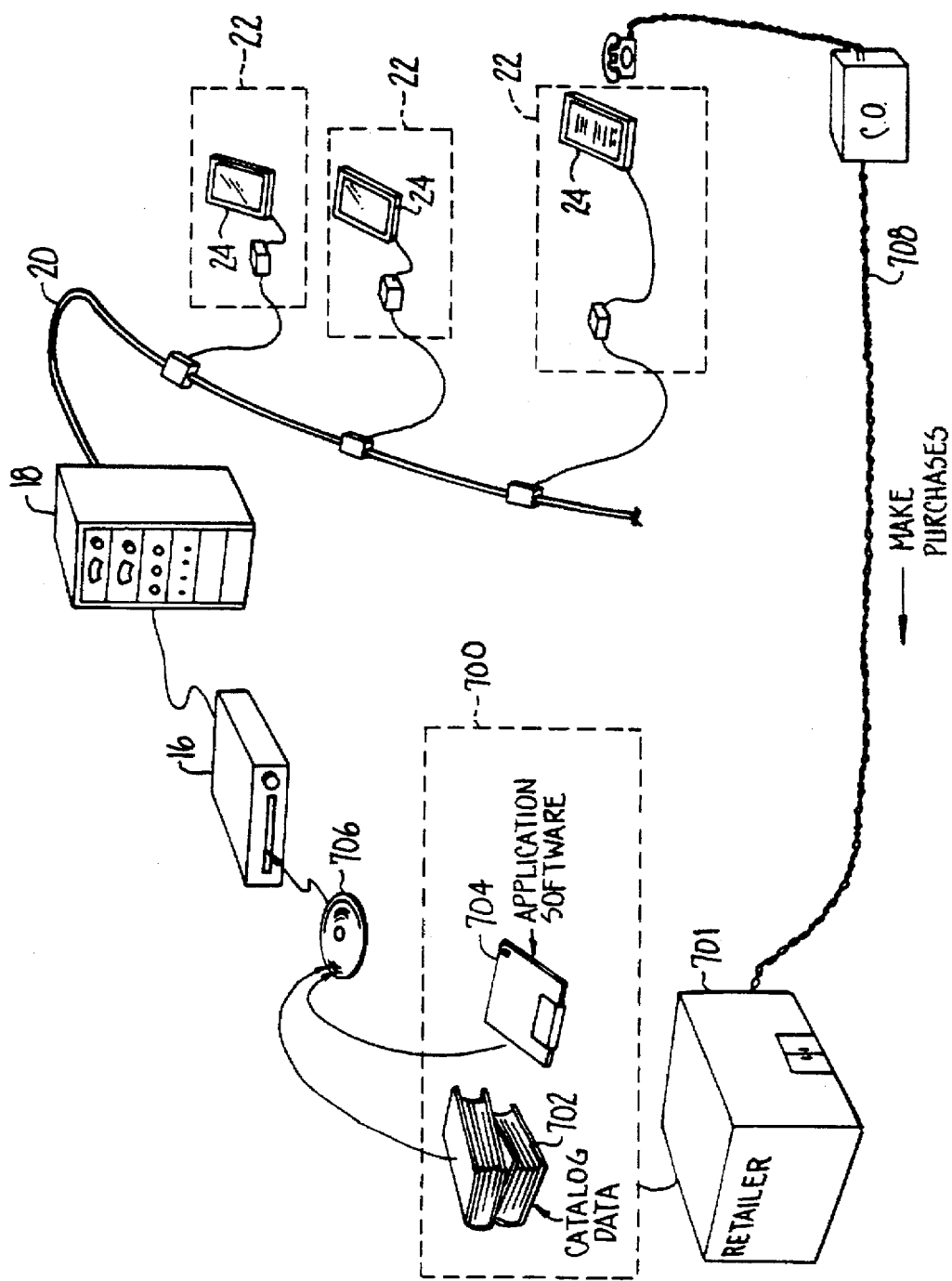
FIGS. 7a to 7c generally illustrate other applications of the system including a "shopping channel" (FIG. 7a), use of the subscriber receiver and display in a computer system (FIG. 7b), and a facsimile machine (FIG. 7c)

FIG. 7a illustrates an additional application of the system herein. The system used in FIG. 7a is applied to a "shopping channel" in which a user may use the same hardware as that disclosed above for catalog shopping. In this case the information transmitted over the cable line will be tailored for a user to view a catalog such as a catalog distributed by a major retailer. In the embodiment shown in FIG. 7a, a retailer 701 uses transmission equipment 700 similar to that described in connection with newspaper publication. The equipment includes catalog data 702 and is run by application software 704. In this particular embodiment, the catalog data are loaded onto a compact disc 706 and distributed to the cable television service provider. This system will be utilized in applications where time restraints are not severe.

The cable television service provider will download data from the disc, and transmit them using a signal generator 16. As with the previous embodiment, the cable service provider will transmit the necessary data over the CATV line 20 to various subscribers. Those who have requested access to the particular catalog in question will be able to download the data into the memory/display unit described above for viewing. The user may then place orders to the retailer over a conventional telephone system 708. Alternatively, downloading can be automated by providing a direct link from the display/memory unit to the telephone lines. Such ordering systems may also be used in connection with the display of telephone directories on the screen to place direct orders to retailers.

Figure 7B:
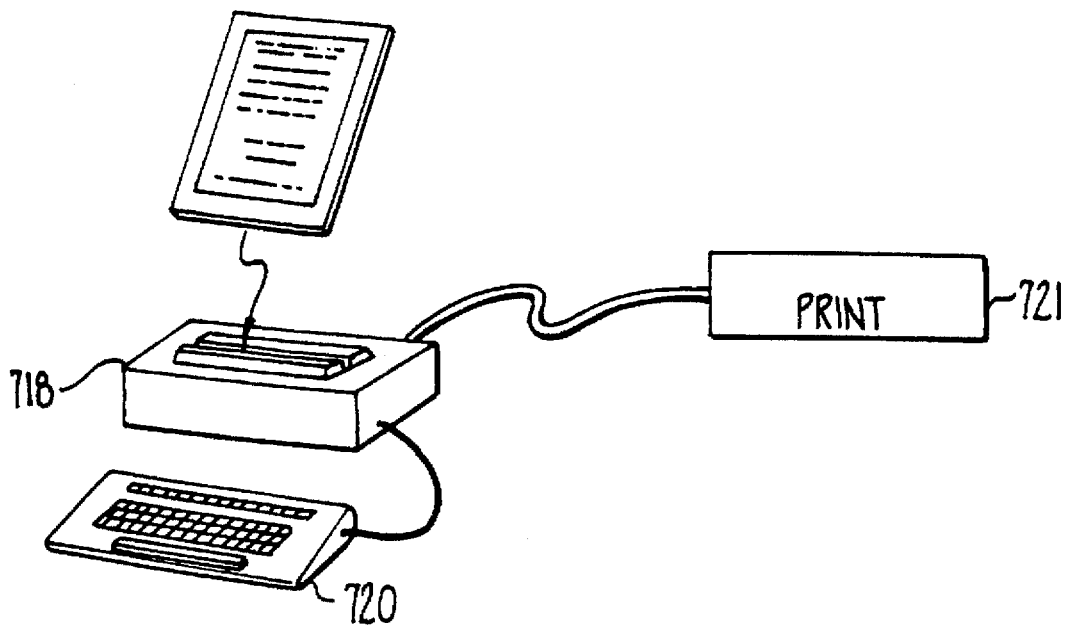

FIG. 7b illustrates another application of the system. In this embodiment, the memory/display unit is alternatively used as a personal computer, simply by dropping the memory/display unit into a PC stand 718 which is connected to a keyboard 720. Since the memory/display unit includes most of the attributes of a personal computer (i.e., sufficient memory, a microprocessor, and the like) the memory/display may be used as a personal computer with an extremely high resolution display through appropriate programming. The stand 718 may contain or be connected to accessories such as a hard disk drive, floppy disk drive, various interfaces, a printer 721, and the like.

Figure 7C:
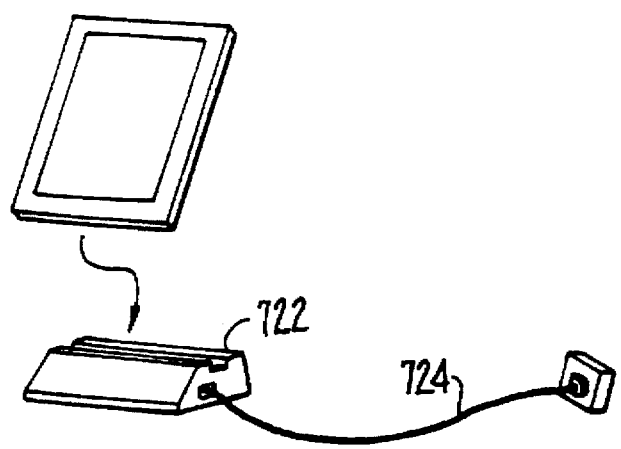

FIG. 7c illustrates application of the memory/display display unit as a facsimile machine. According to this aspect of the invention, the memory/display unit is placed in a stand 722, which includes appropriate interfaces for receiving a facsimile messages over a conventional telephone connection 724. According to this aspect of the invention, bitmaps of a facsimile image are downloaded by the stand 722 to the memory in the memory/display unit. The user may then scan through the facsimile in the same manner as a newspaper.

It will be apparent that other applications of the system will be possible. For example, while reading the newspaper it will be readily possible to display a video crossword puzzle, to which a user will input various words, and later have the puzzle scored based on input time and accuracy. Other more complex video games may also accompany a newspaper according to some embodiments.

Example User Sessions

A. Hardware and Software Used In Demonstration

Figure 8:
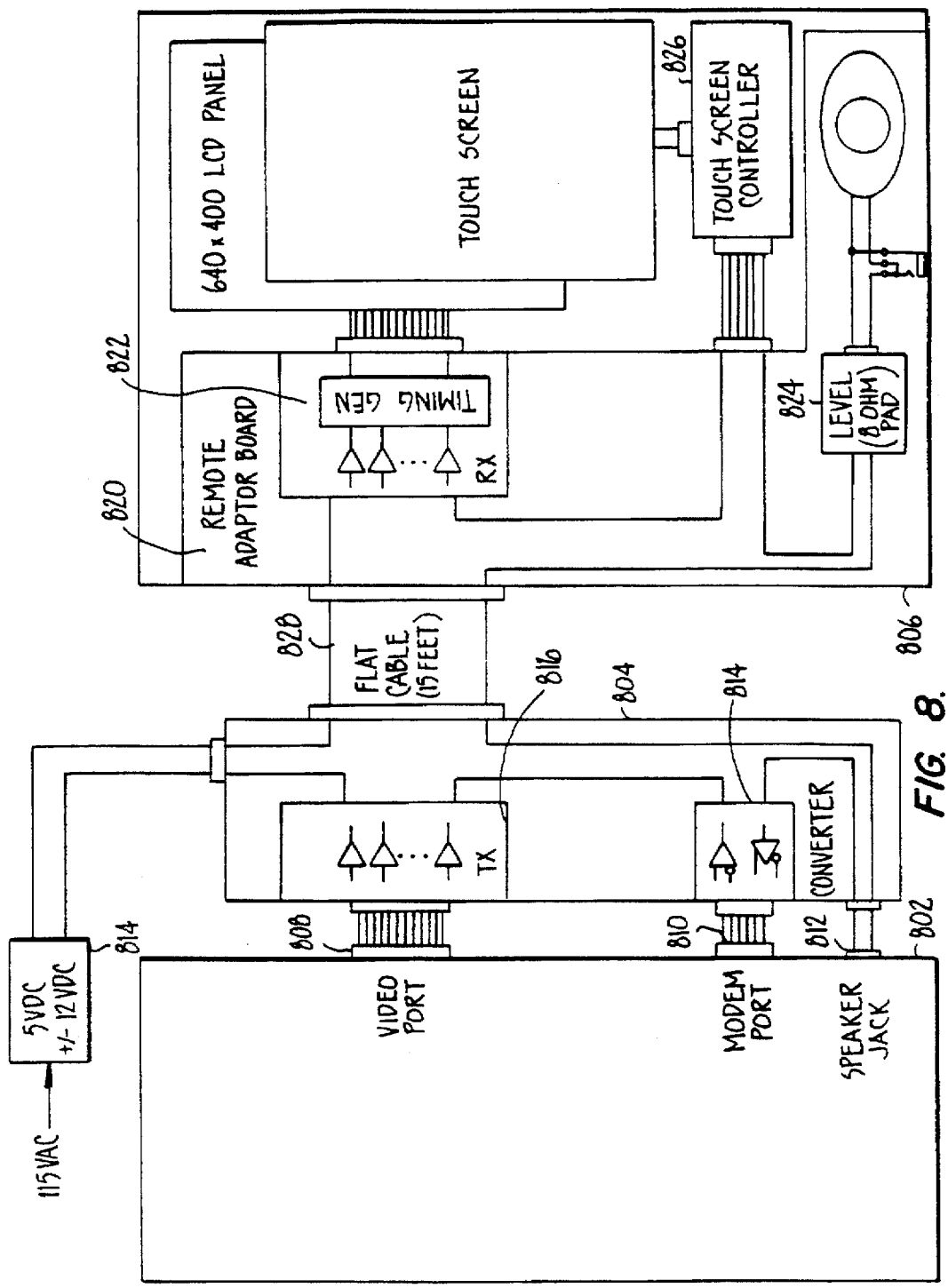
FIG. 8 illustrates the electronic hardware configuration of a demonstration system.

FIG. 8 illustrates the electronic hardware configuration of a system used to demonstrate the efficacy of the invention. As shown therein the demonstration system is based on a Macintosh portable computer 802 connected to a remote interface 804 that drives a remote display 806.

The computer 802 is connected to the interface 804 via a conventional video port 808, an RS-422 modem port 810, and a speaker jack 812. Power is provided to the interface by way of an ac to dc power supply 814. In the interface, an RS422/RS232 converter serves as an interface to provide appropriate RS 232 signals to the remote display. A line driver circuit 816 serves as an interface to provide appropriate video signals to a multiple twisted pair data cable 820, along with the RS 232 signals.

Signals are input to the remote terminal display from the flat cable by way of a remote adaptor board 820. Video signals are provided to the touch screen/LCD panel combination by way of a video data line receiver circuit and timing logic circuit 822, while audio is provided to the speaker/earphone jack by way of an 8 ohm audio amplifier 824. The audio loudness may be adjusted by way of an external manual potentiometer. An RS232 touchscreen controller 826 such as an IntelliTouch Serial Controller made by Elegraphics provides appropriate user input to the system by way of the touch screen.

FIGS. 9a to 9g are flow charts illustrating the software used in the demonstration system, the source code for which is provided in Appendix A, © 1992, Raychem Corporation, All Rights Reserved.

MacroMind Director 2.0 (Copyright 1986–1989 by MacroMind, Inc.) multimedia software is used to provide a demonstration of the newspaper applicaton for the M/D unit. The application software runs on a Macintosh Portable computer with 4 Megabytes of RAM.

There are some basic concepts inherent in the MacroMind Director application software. The overall concept for the programmer is that of creating a movie. A cast of characters is created using built-in draw or text features of the program, or they may be imported after being created using other application software. The cast can be graphics or text. The graphic cast is positioned on a 'stage' by the programmer by dragging the cast member from the cast window to the stage. Any one view of the stage is a 'frame' in the movie.

The movie that is created is controlled by using the 'score' which allows specification of timing, sound, and script for each frame and the display transition from one frame of the movie to another. Twenty-four 'sprites' are the maximum number allowed in any one frame of the movie. A cast member is called a 'sprite' once it is place don the stage.

Using a built-in macro language called Lingo, the programmer can switch cast members or change the positions of sprites on the stage. The Lingo macros allow the programmer to control other aspects of the movie also such as movement from one frame of the movie to another in an arbitrary order, pausing to wait for user input through the portable computer's built-in mouse or through a peripheral input device such as the M/D unit's touchascreen, etc. The Lingo macros are actually text cast members and may be associated with specific frames of the movie by using the script sprite in the score.

The user interface consists of a display, a speaker and volume control and a touchscreen. The user interacts with the M/D unit by touching the surface of the display (touchscreen) in specific locations indicated by selectable objects on the display. Selectable objects may appear as buttons, articles or ads, or text. The objects are created using MacroMind Director factories as described in the following section. The user will receive video or audio feedback when a selectable object is touched.

There are two types of buttons. One type of button when touched appears to depress then return to an undepressed state. There may be other visual results of the button touch depending on the button's function. Another type of button appears to be a blank rectangular object until touched. Touching will result in words appearing in the button's rectangular area and pictures specifically related to the button in a picture window on the display. There also may be buttons within buttons. Some rectangular buttons may appear to have several selectable sections, and the user will get different results depending on which section is touched.

News articles, ads, and pictures also are selectable. Touching an article will result in an active article indicator appearing in the upper left corner of the article block and in article-specific navigation, related, and clip buttons appearing on the display. Also connected to some articles, pictures or ads are movie, slide, and/or sound buttons. Touching one of these buttons will create visual changes in the display or produce a sound and will also activate the article, if one, associated with the button.

Text objects also may be selected. One type of text object is a headline which when touched will be displayed in reverse video then returned to normal video before the object's function is implemented. Another type of text object is a selection available in a scroll window. When this object is touched, a check mark is displayed (or cleared) to the left of the object.

Games and other types of entertainment may provide completely different interfaces, so the types of selectable objects are not limited to those described above.

Factories are created by the programmer when several objects exist which have similar characteristics—such as deprssable buttons with different functions. Each object created by a specific factory has its own set of traits (instance variables) connected directly to the object. Macros can be called for factory objects without these variables being passed since the system 'knows' what they are. The software routines associated with factories are called 'Methods'. If the methods for each factory are named alike, the main software loop can call these methods for an object and the correct factory will be entered automatically. Factories allow the software to be more compact and efficient.

FIG. 9a illustrates the overall architecture of the software used in the display system. The software includes modules which may be grouped into one of 7 general categories. The first group of modules relate to the establishment of the layout of the screen as shown in group 902. The files in this group include mNew which is generally directed to the creation of system factory objects and initial page layout arrays. mCkStatus checks to determine when a user has pressed a button which may be either a system or object-specific navigation button on the screen. mDoSomething is used to implement functions of the system navigation buttons.

The next major group of modules are referred to as the "button" modules 904. The button modules include a file named mNew which creates a button on the screen which appears to depress when touched. The file mDeactivate makes a button appear to be undepressed, while the file mActivate makes the button appear to be depressed. mCkStatus checks for the user's pressing of a button while mDoSomething implements the function of various buttons when they are activated by the user pressing the screen.

The third group of modules is referred to herein as the array modules 906. This group includes a file named mNew which creates objects to be used to store system information. As used herein an "object" is an encapsulated code module that has its own set of methods (macros) and instance variables. An instance variable available only to the object with which it is associated. There may be several objects that have variables of the same names, but each object will have different values for its variables. An object is created for each article or each headline on a page, and an object is created for each button on a page of the newspaper. Pointers for these objects are stored in the array objects "articles" and "buttons". mClearObj disposes of objects whose names are stored in an array. mPutUndo stores the state of the display for a first in first out stack. mGetUndo retrieves the state of the display from an undo log. mPutQ stores information in a general purpose circular queue, while mGetQ retrieves information from the general purpose circular queue. mShowClip retrieves clip log information from the general purpose queue.

The fourth group of modules are referred to as the select modules 908 and include a file named mNew which creates selectable objects such as newspaper articles that may have associated sound, movie, or slide buttons. mClearObj disposes of button objects whose names are stored in the "buttons" array created by a select factory object. mDeactivate makes select objects appear to be unselected by covering object specific navigation buttons and removing an active indicator. mActivate makes select objects appear to be selected by displaying object specific navigation buttons and an active indicator. mCkStauts checks to see if a select object or any associated sound, movie, or slide buttons have been pressed. mDoSomething implements functions of object specific navigation buttons if pressed when selected objects are active.

The headline files 910 include a file named mNew which creates headline objects whose function is to provide another method of navigation through the newspaper. The "headline" objects appear to the user as a list of headlines with no pictures or article text. When the user touches a headline, it appears in reverse video. The display then changes to show the page of the newspaper where the article with that headline appears.

Figure 9B:
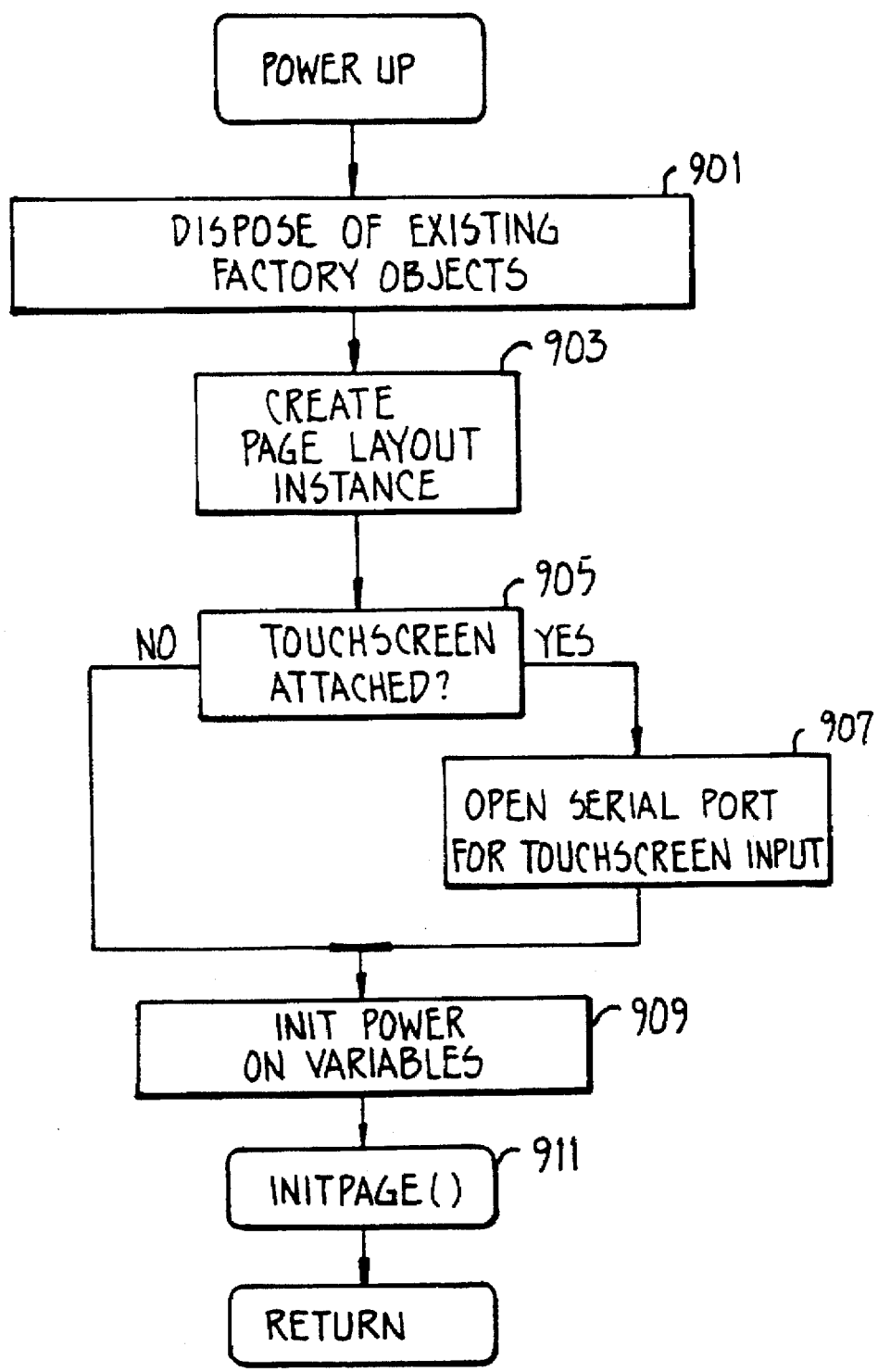

FIGS. 9b to 9g illustrate operation of the software system shown in FIG. 9a. FIG. 9b illustrates the initial procedures conducted during power up. At step 902 the system disposes of pointers to existing factory objects. At step 904 the system creates a page layout instance and at step 906 determines if a touchscreen is attached. If so, the system opens a serial port for touchscreen output at step 907. If not, or after opening the serial port, the system initializes certain power-on variables at step 909 and initializes a page on the display at step 911 and then returns.

Figure 9C:
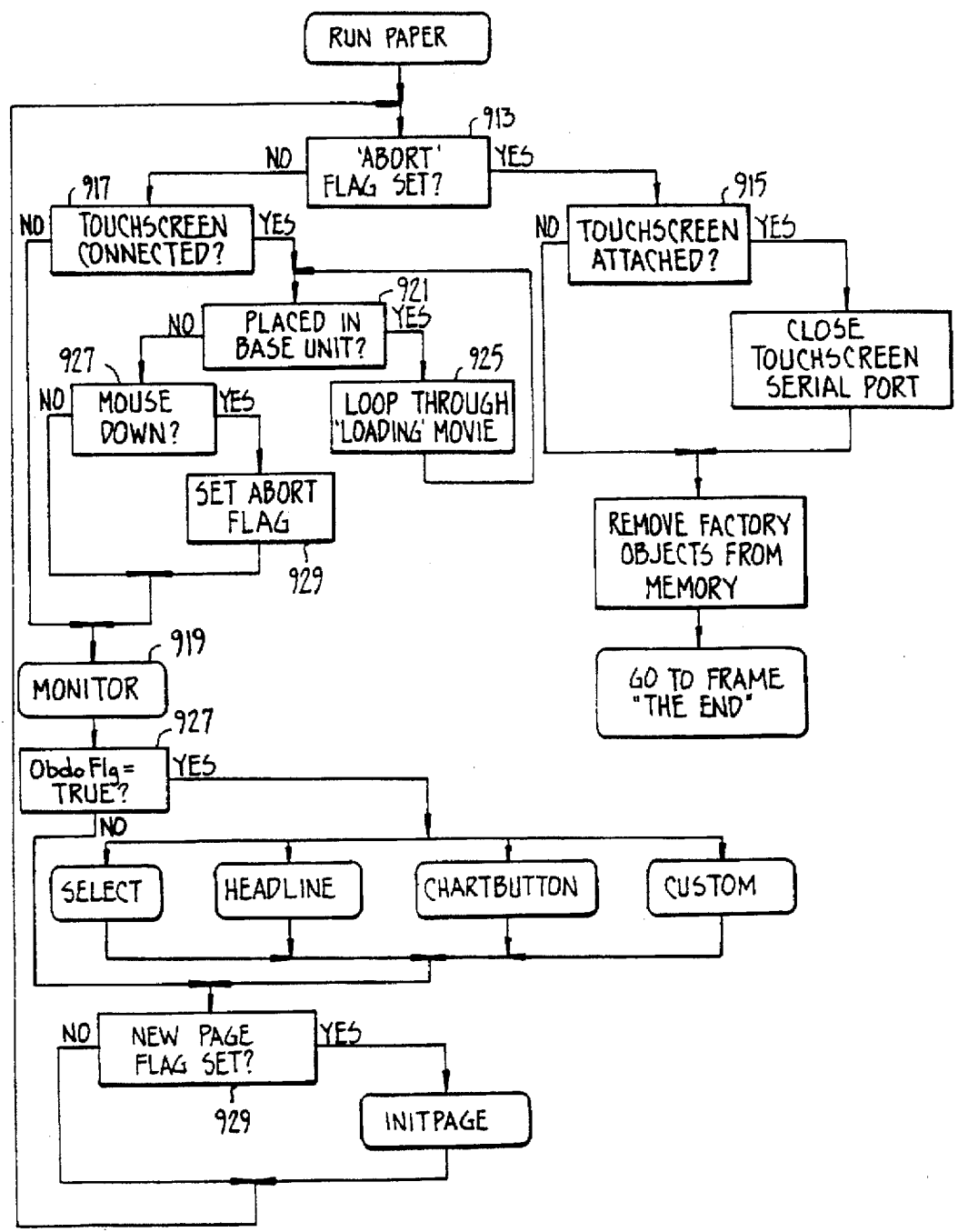

FIG. 9c illustrates the overall scheme for displaying the paper. At step 913 the system checks to determine if an abort flag is set and, if so, the system determines if the touchscreen is attached at step 917, and closes the touchscreen serial port if so. The system then removes the pointers to factory objects and their related instance variables from memory, and displays the ending page on the screen.

If the abort flag is not set, the system determines if the touchscreen is attached at step 917. If not, the system performs the monitor routine at step 919. If the touchscreen is connected, at step 921 the system determines if the unit is in the base unit. If so at step 923 the system begins looping through display of the paper or the "movie" to be displayed at step 925 and returns upon completion to check if the base is attached.

If the base is not attached, the system determines if the mouse is down at step 927. If so, the abort flag to end the session is set at step 929. The system then proceeds to the monitor routine as per step 919. At step 927 the system determines if the selection flag is set which indicates a selection has been made and if so proceeds to the "select," "headline," "chartbutton," or "custom" routines described elsewhere herein. When the selection is made by the user, the pointer to the selected object is saved. This pointer is used to call the correct routine. If the selection flag is not set, or upon completion of the relevant routine, the system determines if a new page flag is set at step 929 and if so performs the initpage routine described elsewhere.

Figure 9D:
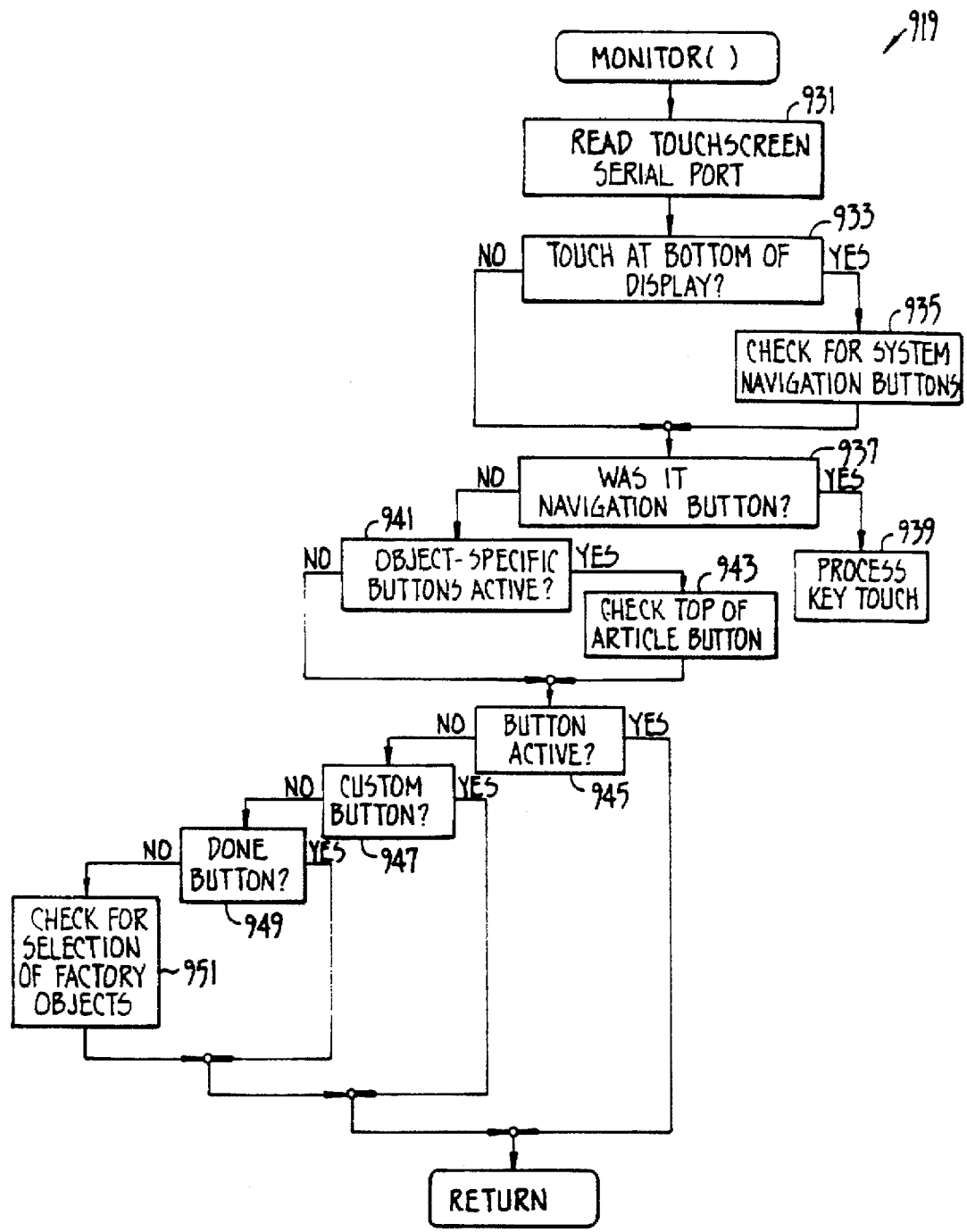

FIG. 9d illustrates the monitor routine. At step 931 the system reads the touchscreen serial port if a touch is being made to the bottom of the display at step 933. If so, the system checks for system navigation buttons at step 935. The system then checks at step 937 to determine if the touched button was a navigation button. If so, at step 939 the routine is called to process the selected navigaion button— "Next", "Back", "Sections", "Front Page", or "Undo". If not, the system checks to see if an object-specific button is already active at step 941 (i.e., a button related to the particular display) and if so, checks the top of article button at step 943. At step 945 the system determines if a button is active. If not, at step 947 the system determines if a custom button is pressed. If not, the system determines if the done button is pressed at step 949. If not, the system checks for selection of factory objects at step 951. Upon answering yes or no to any of these questions, the system then returns to the calling routine.

FIG. 9e illustrates the InitPage() operation. Each time the user makes a selection which requires the display of a new page, the routine InitPage is called. This routine clears all of the variables connected with the display of the current page then sets these variables properly for the new page to be displayed depending upon the type of selections available to the user on the new page. The page pointer is moved to the correct frame number and the display is refreshed to show the contents of the new page.

B. Screen Sequences During Typical User Sessions

Figure 10A:
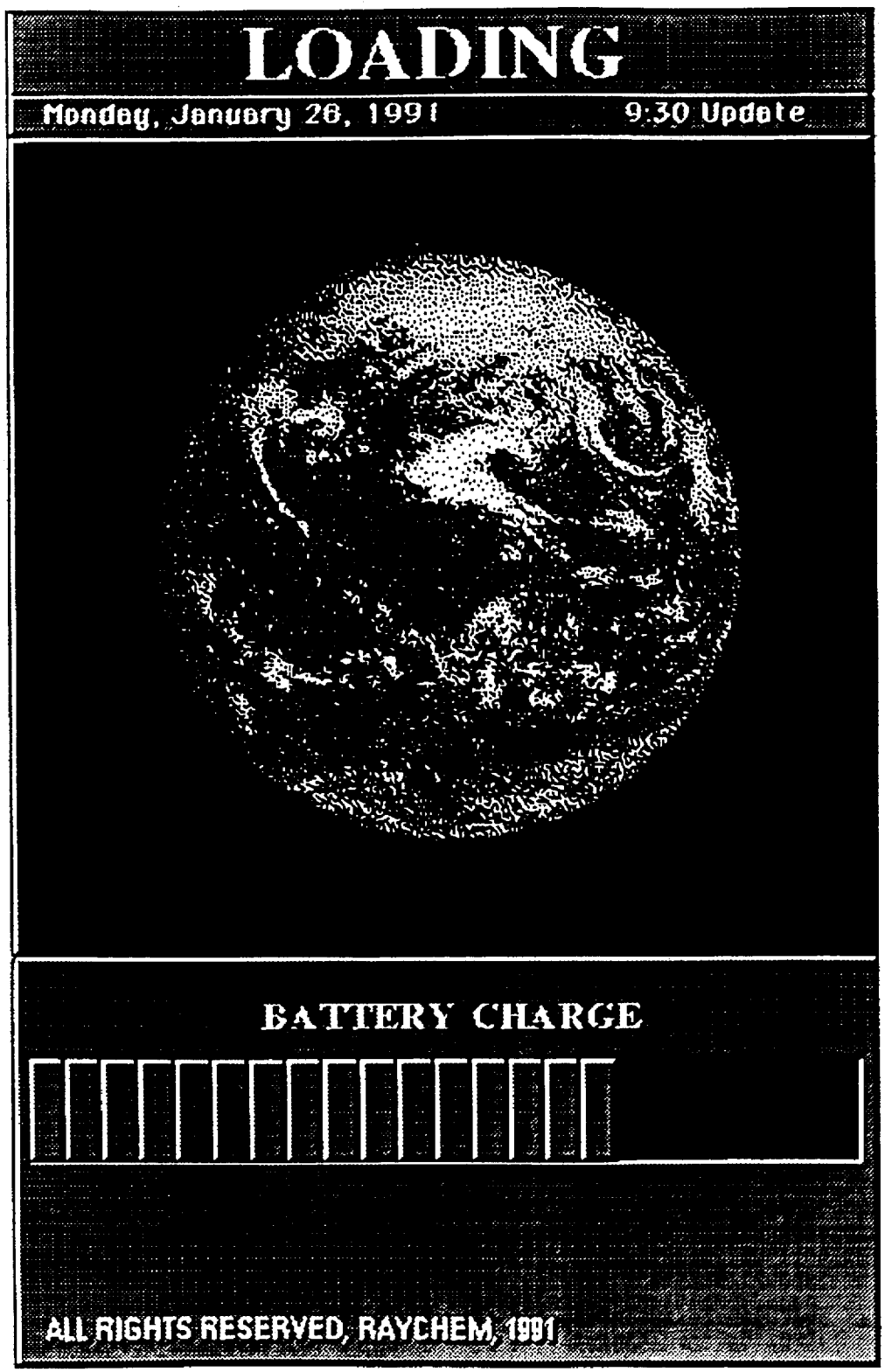

FIGS. 10a to 10j illustrate the sequence of screens viewed by a user in a typical user session. In particular, FIG. 10a illustrates the screen display during a boot-up phase after the device is turned on. During this phase of operation, the device will be placed in the stand which provides connection to the cable television line. Initialization procedures are conducted within the device, and data are downloaded from the cable television line to memory of the device. Accordingly, the device displays the "loading" indication. Optionally, a battery charge display 1002 is provided to give an indication of the charge level in the batteries of the memory/display unit.

FIG. 10b illustrates the first screen display which is provided to the user after or during downloading of the data to the memory. Using conventional broadband signals, it is expected that the necessary data for a newspaper may be downloaded in less than about 60 seconds. According to preferred embodiments, the first page of the paper is displayed while the remainder of the paper is being loaded to provide the illusion of immediate response. From this stage on, the user may remove the device from the stand since all necessary data are contained within the memory of the memory/display unit. As shown, the display is very similar to the front page of a typical newspaper.

The display provides various graphics 1008, text sections 1010, and a control section 1012. The control section 1012 provides a control scheme which enables the user to flip through the newspaper in much the same manner as a conventional paper newspaper, and at the same time the interface is sufficiently simple that it can be used by a computer illiterate user. The control section generally includes a "related articles" section 1009, and a "general use" section 1011. The articles specific section 1009 provides for movement within an article of interest, while the general section provides for movement more generally within the newspaper.

In particular, the general control section 1011 includes a "button" 1014 for moving from whatever page is currently displayed to the front page (obviously, this button will have no effect in the page display shown in FIG. 10b). It will be understood that while the description herein makes reference to "buttons" in the control section, these are actually regions of the screen with graphical displays resembling buttons, which are activated by touching the SAW-type screen.

The general control section also includes a "next" button 1016. The function of the next button is to move the screen display to the next page of the newspaper. A "sections" button 1018 in the general control section moves the display to a display which lists the various sections of the newspaper for selection by the user such as the sports, classified, and weather sections. A "back" button 1019 moves the display to the previous page of the newspaper. An "undo" button 1020 reverses the previous action of the user.

In the articles-specific section 1009, a page forward button and page back button 1022 and 1024, respectively, provide for paging forward within a particular article of interest. If, for example, the user desires to read more of the "Fiber Optics . . . " story, the user initially presses the portion of the screen which contains the "Fiber Optics . . . " story. The screen display will then automatically move to the next page containing a portion of this story. To continue reading additional pages of the "Fiber Optics . . . " story or move back to previous pages containing this story, the user then uses the page forward and page back buttons 1022 and 1024.

The related specific section 1009 also contains a "saved" button 1026. When pressed, the presently selected article is copied to permanent memory such as a hard disc in the unit.

The related articles section further contains a related articles button 1028. After the user has selected an article by pressing the region of the screen displaying that article, pressing the related articles button will provide a listing of all articles in that edition of the paper which relate to this story.

FIG. 10c illustrates the screen display after the user presses the region of the screen in FIG. 10b containing the "Fiber Optics . . . " story. As shown, the screen automatically moves to the next page of the newspaper which contains this story. If the user wishes to continue to read this story, the user would press the next page button 1022.

This page also illustrates additional features of the system. In region 1032, the first frame of a cartoon is shown. A button 1034 is displayed next to the cartoon. Pressing the button 1034 will change the cartoon to display the next frame thereof, but will not otherwise alter the screen display. As shown in this page, advertisements 1036 are also readily provided. Of course, it will be readily possible to make the advertisements and other portions of the paper "dynamic." For example, the advertisement shown in region 1036 may readily be programmed to have the man therein move his arm, or the text could alternate between a display of the store name and the store address/phone number. This type of advertising could be expected to draw far greater consumer response than the static advertisements in a paper newspaper. Furthermore, a particular user's geographic information or other identifying data could be entered into the memory/display unit in which case certain advertisements which have been downloaded into memory would be preferentially displayed for a particular user. For example, if the zip code of the user is entered in RAM or ROM before delivery, and the zip code is in a rural location, advertisements related to farming or the like would be preferentially displayed while different advertisements would be displayed for users having a city zip code.

Figure 10D:
Figure 10E:
Figure 10F:
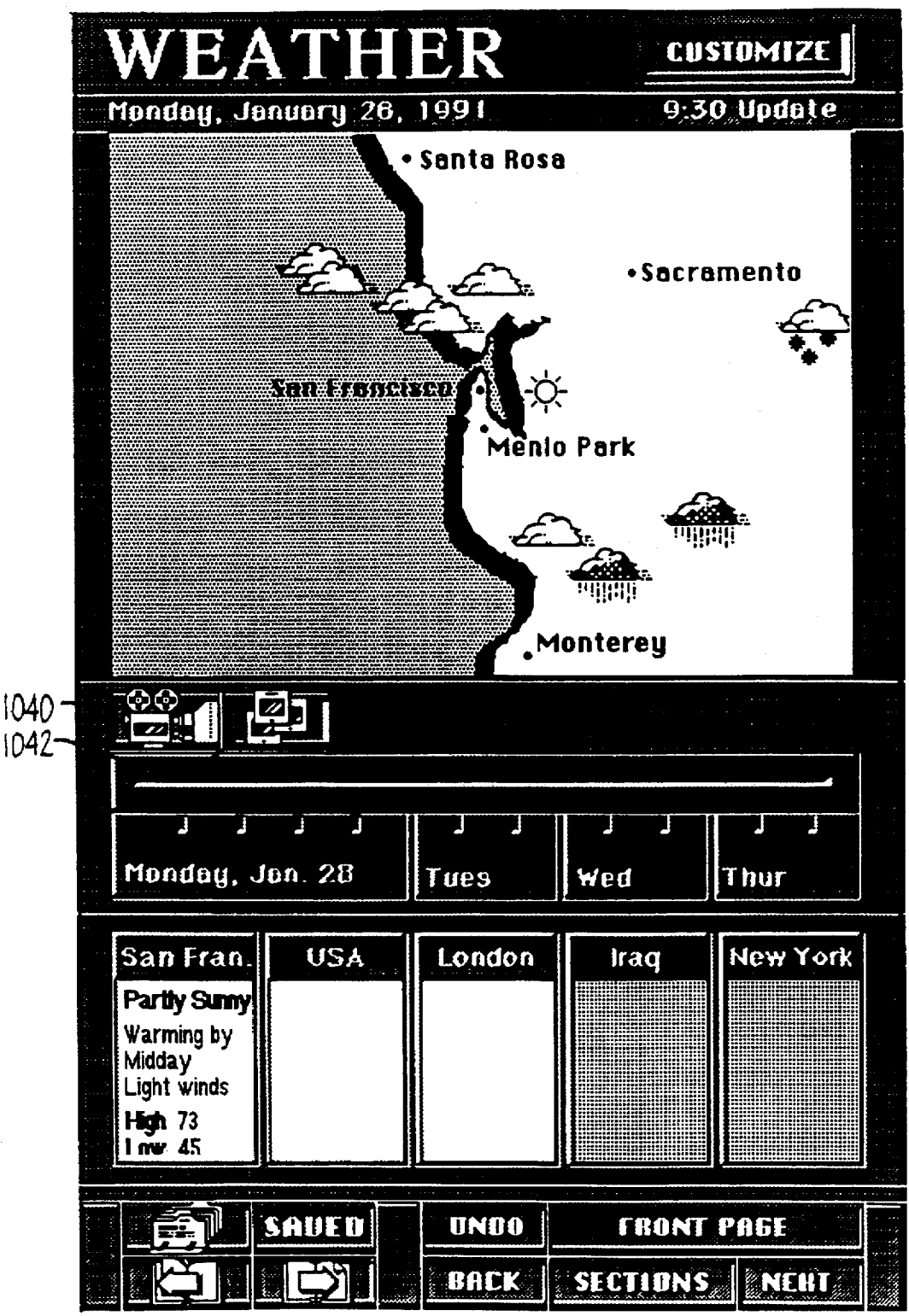
Figure 10G:
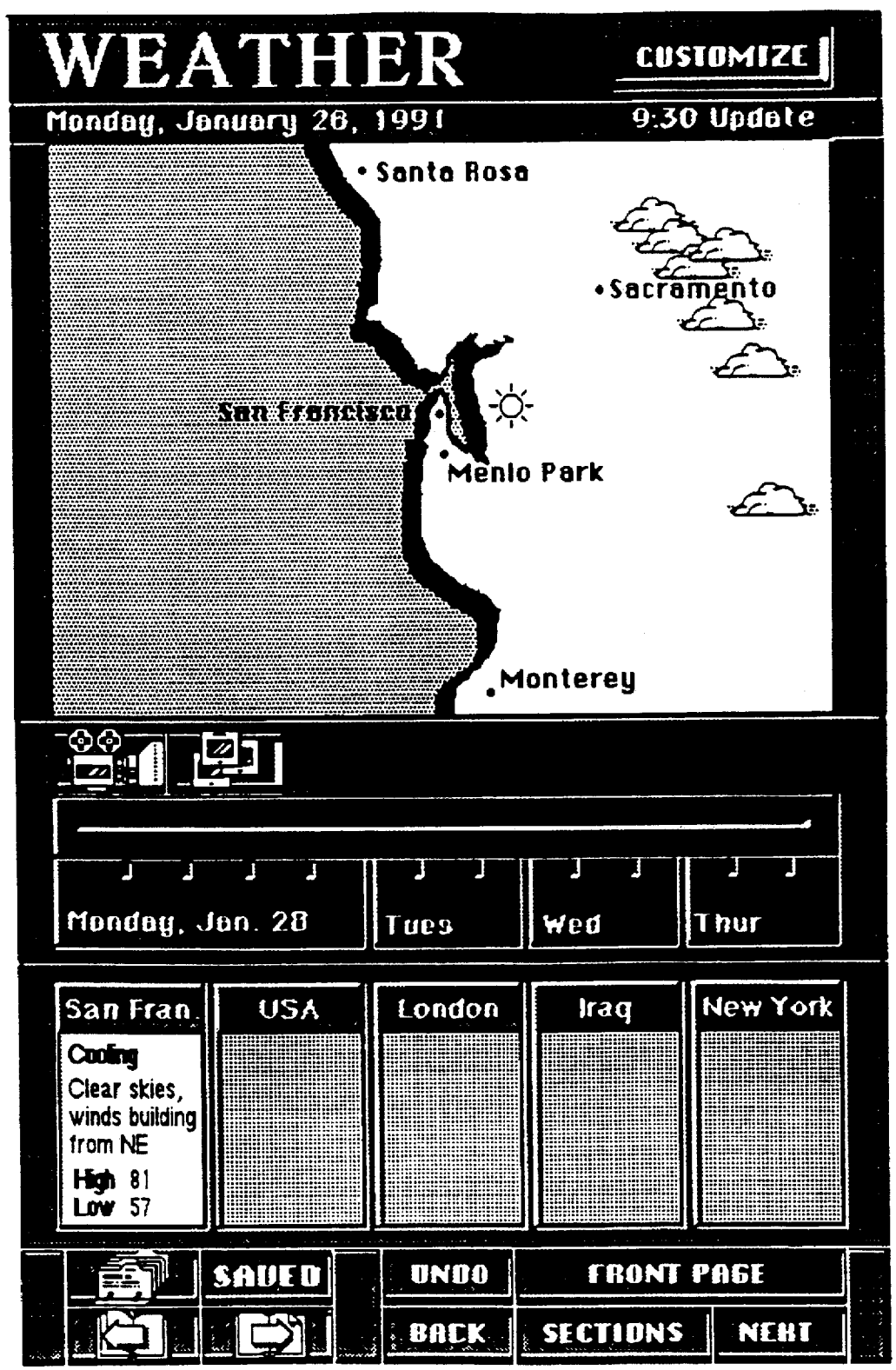
Figure 10H:

FIG. 10d illustrates the screen display when the "sections" button is pressed. As shown, the screen now displays the upper corner of the various sections of the newspaper, in this case the sports, classified, and weather sections. The screen also allows access to a "customize" feature and a "market watch" feature, which are described in greater detail below. From the screen in FIG. 10d the user may, for example, press the "sports," "weather," or "classified" section of the display, in which case the screen will move to the front page of the sports section, such as shown in FIG. 10e, the weather section as shown in FIG. 10f and 10g, or the classified section, as shown in FIG. 10h. Each of these sections has been "customized" using the procedure illustrated below.

As with other sections of the newspaper, the user may, for example, scroll forward a page, back a page, or move to the next page within the sports section as shown in FIG. 10e. The weather displays shown in FIGS. 10f and 10g illustrate other important features of the system. In particular, the weather screen has motion and frame buttons 1040 and 1042, respectively. When the user presses the motion button 1040, the weather display moves the display through time in a continuous fashion to show, for example, the clouds moving across the screen. When the user presses the frame button 1042, the screen is moved to a next frame of time which may be, for example, one day later. By using the time bar 1044, the user may display the weather at a selected time in the future. For example, the user may press "Tues" to show the weather situation in the next Tuesday. As shown, the time scale is more finely divided for the upcoming 24-hour period than for later times. FIG. 10g illustrates the weather screen after the user has pressed the motion or frame buttons to move to a later time.

FIG. 10h illustrates features of the classified section. This section has been customized by the user to show houses within a particular price range and geographic location. As shown, the user is presented with a list of addresses in section 1050. Upon pressing one of the addresses, the section 1052 displays a photograph and complete description of the listing. Similarly, the user herein has identified cars within a particular price range to be displayed in section 1054 and jobs of a certain category to be displayed in section 1056.

Figure 10I:
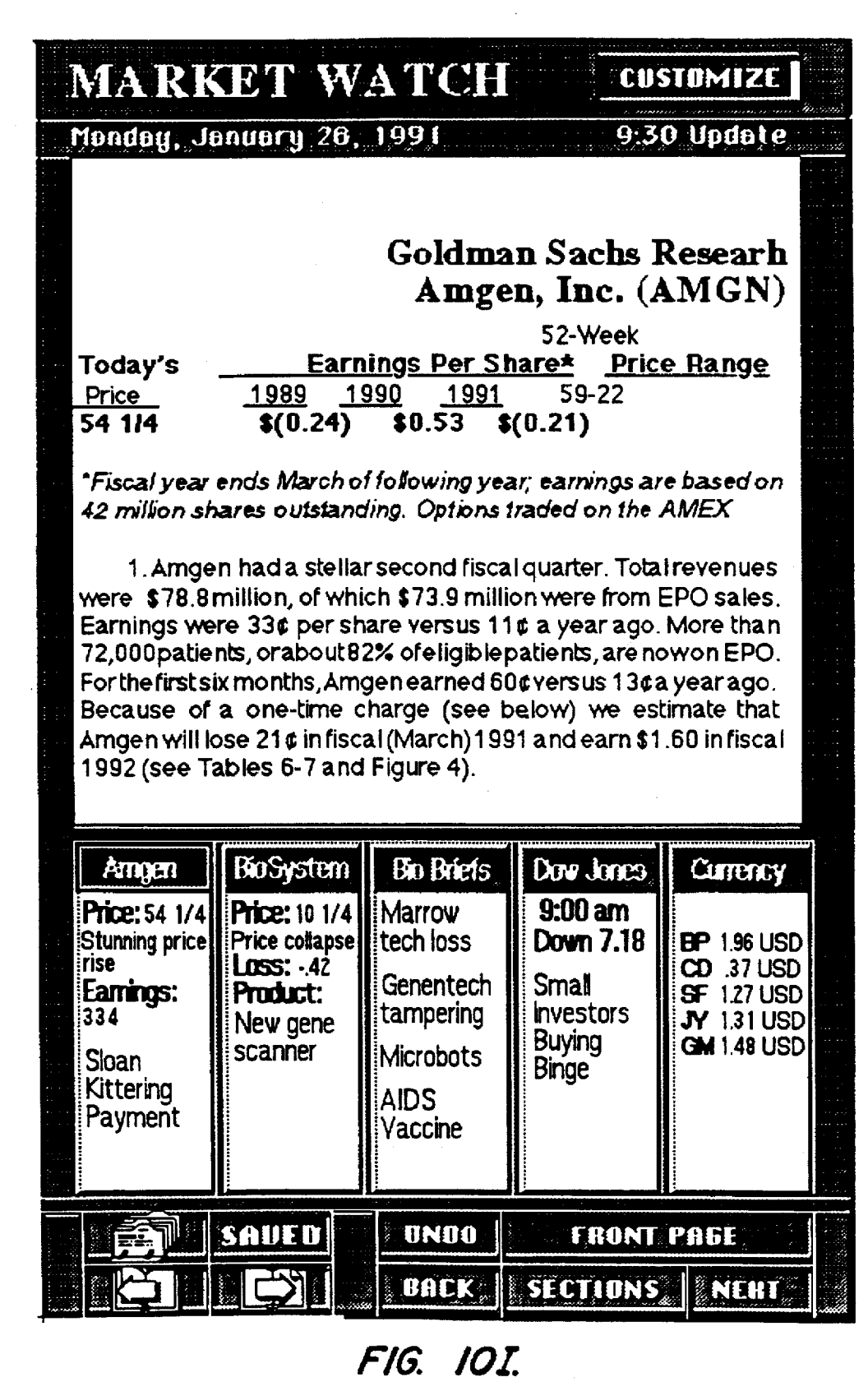

FIG. 10i illustrates the screen display after the user selects the "market watch" feature in the sections display. This section has also been customized by the user. In this case, the user has customized the screen to illustrate companies in a particular category (biotech) and other general information.

Figure 10J:
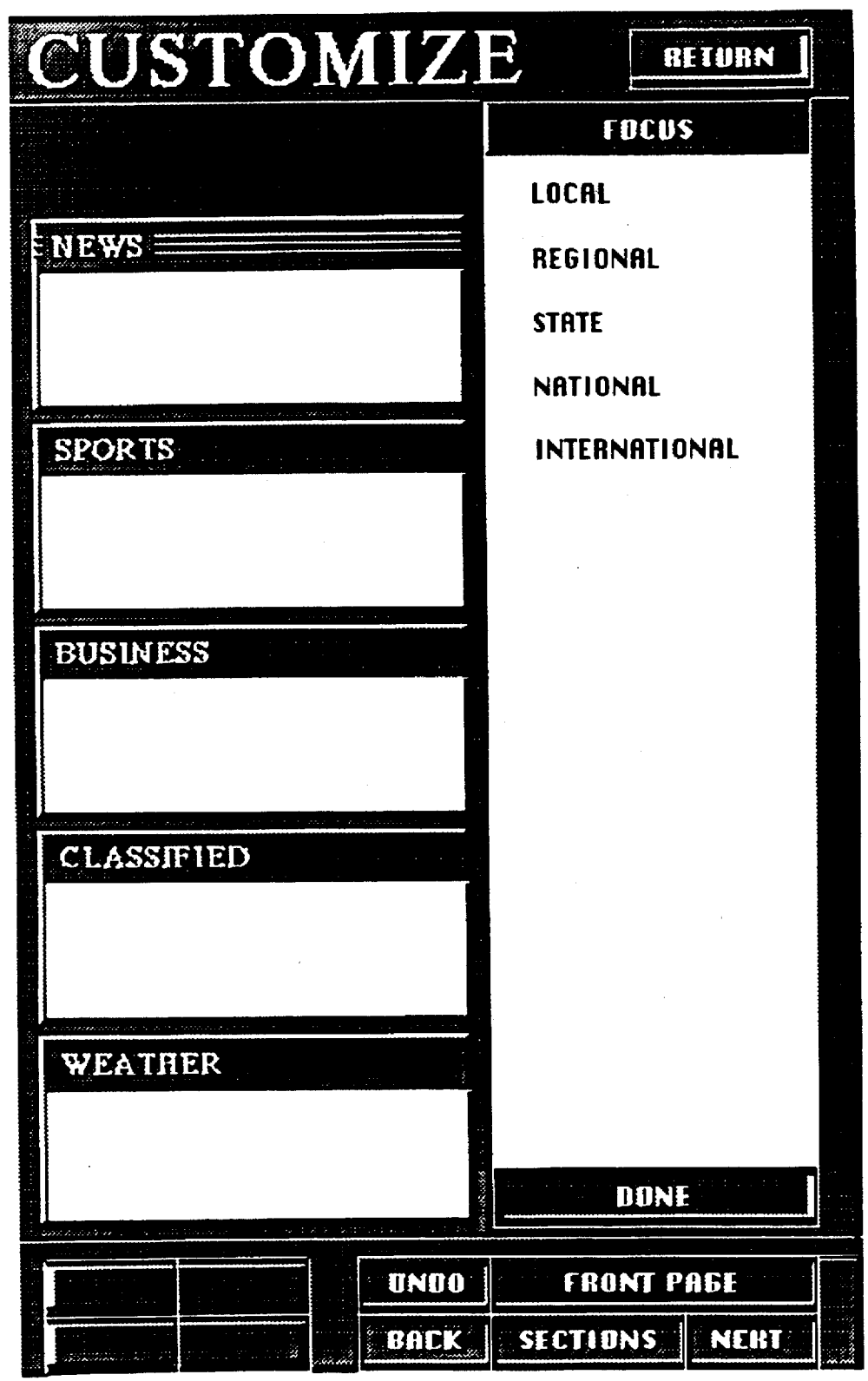

FIG. 10j illustrates the customization screen, entered by striking "customize" in the sections display. The search system is based on the concept of keywords associated with each article or its classified entry. Fortunately it will be able to describe most of the contents of a paper with relatively few keywords. The computer in the display will simply match keywords based on entries to the customization section by the customer.

In the customize screen the relevant keywords are displayed, and the user is allowed to select desired areas of interest. For example, when the subscriber customizes classified ads, the user is presented with a list like: can, have, plane, pets, etc. If house is selected the area will be presented with ads in the home section. Price ranges, locations and the like may be selected with another level of customization.

Figure 10K:
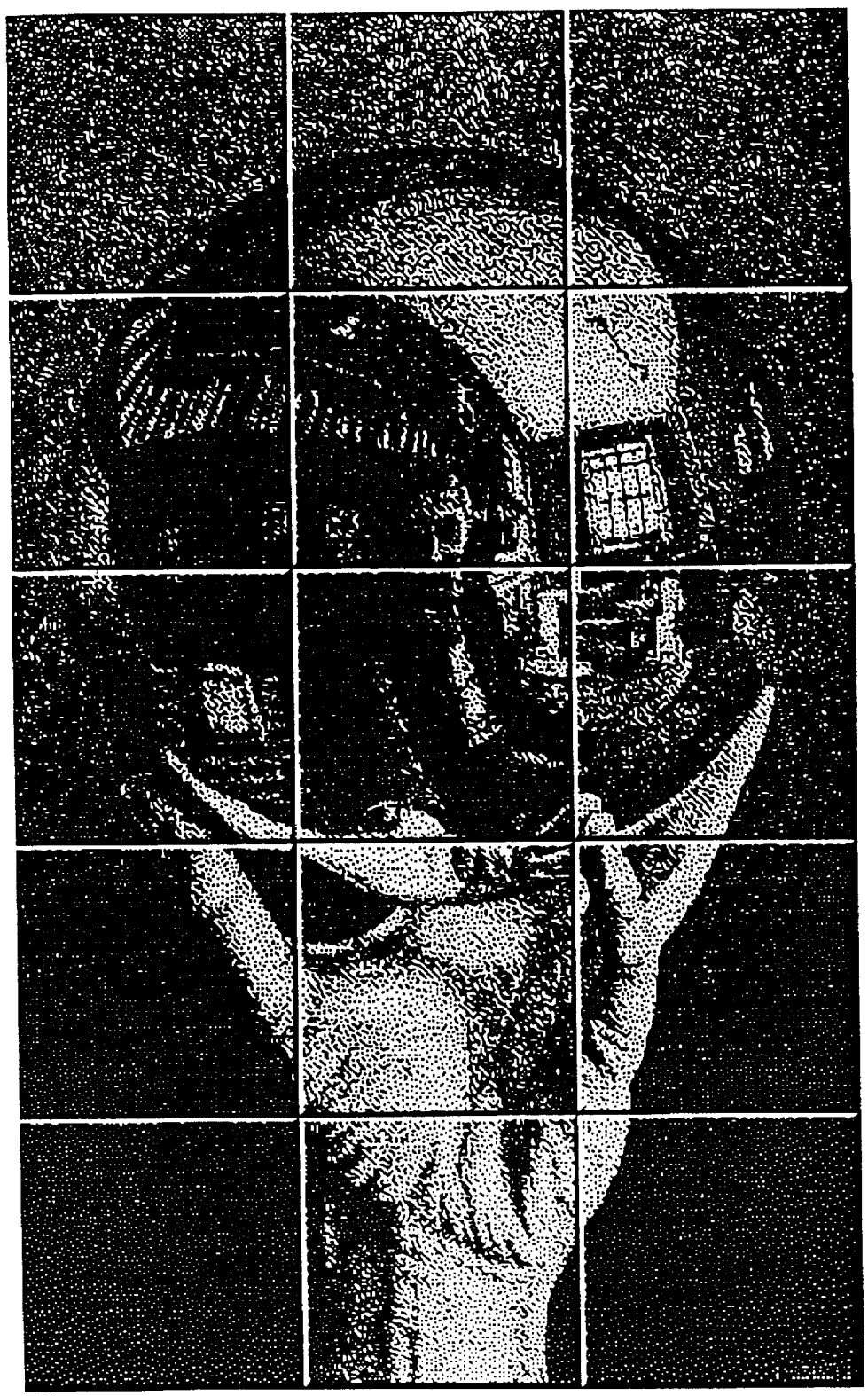

FIG. 10k illustrates a typical game which may be played by a user in which various blocks are re-arranged to complete a puzzle.

The above description is illustrative and not restrictive. Many variations of the invention will become apparent to those of skill in the art upon review of this disclosure. Merely by way of example the system may be used to view material other than newspapers such as magazines, catalogs, and the like. The scope of the invention should, therefore, be determined not with reference to the above description, but instead should be determined with reference to the appended claims along with their full scope of equivalents.

APPENDIX A

Demonstration Software

© Copyright 1992
Raychem Corporation
All rights reserved.

A11 --This cast member contains factories
--layout factory called at power on
Factory layout Method mNew
global nav, rel,info,slideVal,Check,NoCheck,touch,SecList set touch=true      --FALSE=mouse input, TRUE=touchscreen
set siz=32          --size of Page array
set  slideVal="049,078,106,134,184,212,257,285,330,356"
set SecList="02,14,17,19,20,22,28"
set Check=E46
set NoCheck=E47
setupinit
set i=1              --clear array
repeat while i <= siz
    me(mPut,i,empty)
    set i=i+1
end repeat --page info tables(pgSetup) : ta,nnn,rrr,bt,ss,li*
--see variables defs for description
me(mPut,1,"S5,001,000,B27,0*002,000,B28,0*008,000,B31,0*003,000,B32,0*010,000,B38,0")
me(mPut,2,"S2,004,000,B36,0*005,000,B33,0")
me(mPut,3,"S2,001,000,B27,0*006,000,B37,1S,11,01")
me(mPut,4,"S2,005,000,B33,0*007,000,B34,0*Atwaadv30")
me(mPut,5,"S2,002,000,B28,0*003,000,B32,0*Avwaddd02")
me(mPut,6,"S2,009,000,B39,0*004,000,B36,0")
me(mPut,7,"S2,002,000,B28,0*003,000,B32,0")
me(mPut,8,"S2,005,000,B33,0*010,000,B38,0")
me(mPut,9,"S2,006,000,B37,0*005,000,B33,0")
me(mPut,10,"S1,003,000,B32,0")
me(mPut,11,"S1,004,000,B36,0")
me(mPut,12,"S2,001,000,B27,0*007,000,B34,0")
me(mPut,13,"C3,F13:03,F16:03,F22:03,C30")      --stock page
me(mPut,14,"S0")           --business
me(mPut,15,"S0")           --business
me(mPut,16,"S0*Abasket25,C29")         --sports
me(mPut,17,"S0")           --sports
me(mPut,18,"C3,C15:10,C27:10,C41:10,W,C32")           --weather
me(mPut,19,"C3,f41:01,f43:03,f46:01,C31")    --classified
me(mPut,21,"H8")           --clip page
me(mPut,23,"H3")           --related page
me(mPut,25,"H7")           --sections page
me(mPut,27,"T5,28,29,30,31,32")     --custom news
me(mPut,28,"T5,29,28,30,31,32")     --custom sports
me(mPut,29,"T5,30,28,29,31,32")     --custom business
me(mPut,30,"T5,31,28,29,30,32")     --custom classified
me(mPut,31,"T5,32,28,29,30,31")     --custom weather --related tables: hhhffs
rel(mPut,1,"A46050A47050")
rel(mPut,2,"A47050")

--navigation tables: ffs*

```
nav(mPut,1,"021*041*131N)
nav(mPut,2,"022*061*081")
nav(mPut,3,"024*062*082*111")
nav(mPut,4,"031*072*121")
nav(mPut,5,"032*051*091*102")
nav(mPut,6,"042*101")
nav(mPut,7,"052*132")
nav(mPut,8,"023")
nav(mPut,9,"071")
nav(mPut,10,"025*092")

--sound,movie,slide info tables info(mPut,1,"105A68")
info(mPut,2,"102B21")

--checks for navigation key press
Method mCkStatus
global frontpg,back,section,next,sectionFlg,nextFlg,backFlg,frontpgFlg,undo,undoFlg
global anext,aback,related,clip,anextFlg,abackFlg,lastx,lasty,active,Aflg set waiting=FALSE
if lasty>166 then
    if lastx<30 then
        if lasty>320 then
            if nextFlg then
                next(mActivate)
                set waiting=TRUE
            end if
        else
            if lasty>228 then
                if sectionFlg then
                    section(mActivate)
                    set waiting=TRUE
                end if
            else
                if backFlg then
                    back(mActivate)
                    set waiting=TRUE
                end if
            end if
        end if
    else
        if lasty>228 then
            if frontpgFlg then
                frontpg(mActivate)
                set waiting=TRUE
            end if
        else
            if undoFlg then
                undo(mActivate)
                set waiting=TRUE
            end if
        end if
    end if
end if
```

```
      if waiting then
          me(mDosomething)
      end if
  else
      if Aflg AND lasty>21 AND lasty<144 then
          if lastx<29 then
              if lasty<81 then
                  if abackFlg then
                      aback(mActivate)
                  end if
              else
                  if anextFlg then anext(mActivate)
              end if
          else
              if lasty>82 then
                  clip(mActivate)
              else
                  related(mActivate)
              end if
          end if
      end if
  end if
end if
set lastx=0

--layout: implements functions of  buttons
Method mDoSomething
global  frontpg,back,section,next,sectionFlg,nextFlg,backFlg,frontpgFlg
global  CurPg,active,undoLog,custom,remPg
global  remcus,CusPtr if active=15 then         --'undo' button
    undoLog(mGetUndo)
    exit
else
    undoLog(mPutUndo)
end if --the following checks the navigation buttons at the bottom of screen
if active=17 then         --'back' button
    back(mDeactivate)
    if CurPg>label("Classified") then
        set CurPg=remPg
    end if
    set CurPg=CurPg-1
    if CurPg < 2 then set CurPg=2    --don't go beyond 1st page
    initpage()
    exit
end if
if active=18 then         --'sections' button
    section(mDeactivate)
    set sectionFlg=FALSE
    set CurPg=label("SectionsPg")
    initpage()
    exit
end if
if active=19 then         --'next' button
```

```
    next(mDeactivate)
    if CurPg>label("Classified") then
      set CurPg=remPg
    end if
    set CurPg=CurPg+1
    if CurPg > label("Classified") then set CurPg=label("Classified")
    initpage()
    exit
end if
if active=16 then         -- 'front page' button
    frontpg(mDeactivate)
    set CurPg=label("FrontPg")
    initpage()
    exit
end if
if active=14 then         --'custom' button
    custom(mDeactivate)
    if CurPg<label("Customize") or CurPg>(label("Customize")+5) then
      set remCus=CurPg
      set CurPg=CusPtr
    else
      set CurPg=remCus
    end if
    initpage()
    exit
end if --
--button factory
Factory makeButton Method mNew button, attribute
instance SpriteNum, SLabel,fnum,msprite,slidePtr set SpriteNum = button
set SLabel = attribute
--put "SLabel= " & SLAbel
if (the castnum of sprite SpriteNum=A37) OR (the castnum of sprite SpriteNum=A36) then
    set msprite=value(chars(SLabel,1,2))
    set fnum=value(chars(SLabel,3,3))
    set SLabel=value(chars(SLabel,4,6))
    set slidePtr=SLabel
end if --makeButton: deactivates a button object by restoring the non-depressed key
Method mDeactivate
global active, activeWho set the castnum of sprite active to activeWho
updatestage
set active = 0
set activeWho=0
--set waiting=FALSE --makeButton: method to activate a button object by removing the non-depressed key
```

```
Method mActivate
global active, activeWho set activeWho=the castnum of sprite SpriteNum
set the castnum of sprite SpriteNum to 0
updatestage
set active=SpriteNum
--set waiting=TRUE --makeButton: method to identify which navigation button sprite is being touched
Method mCkStatus set tmp = 0
set tmp=ckbutton(SpriteNum)
if tmp then
    me(mActivate)
end if
return (tmp)

--makeButton: method to operate buttons(ear,movie,slides) created by "article" objects
Method mDoSomething me(mDeactivate)
if the castnum of sprite SpriteNum=A35 then        --sound
   set the soundEnabled to TRUE
--put SLabel
   puppetSound SLabel
     set i=20
     repeat while i>1
       wait
         set i=i-1
     end repeat
     set the soundEnabled to FALSE
     puppetsound 0
     exit
end if
if the castnum of sprite SpriteNum=A37 then        --slides
      set slidePtr=slidePtr+1
      if (slidePtr-SLabel)>=fnum then
        set slidePtr=SLabel
      end if
else
    if the castnum of sprite SpriteNum=A36 then    --movie
        set slidePtr=SLabel
        set i=0
          repeat while i<=fnum
             set the castnum of sprite msprite=slidePtr+i
             updatestage
             set i=i+1
          end repeat
    end if
end if
set the castnum of sprite msprite=slidePtr
```

```
--factory to create arrays
Factory makeArray

Method mNew tops
instance max,front,rear set max=tops
set front=1              --init queue pointers just in case
set rear=1
set i=1
repeat while i <= max
    me(mPut,i,empty)     --clear the array
    set i=i+1
end repeat --makeArray: disposes of objects whose names are stored in an array
Method mClearObj set i=1
repeat while i <= max
    set obj=me(mGet,i)
    if objectp(obj)=TRUE then
        obj(mClearObj)    --1st clear nested objects
        obj(mDispose)
        me(mPut,i,empty)
    end if
    set i=i+1
end repeat --method to log state of the system for undo button
Method mPutUndo
global undoFlg,CurPg,Sactive set undoFlg=TRUE
if the castnum of sprite 15 = A16 then
    set the castnum of sprite 15 to A15
    updatestage
end if
me(mPut,front,CurPg)          --frame #
me(mPut,front+1,Sactive)         --& active article
set front=front+2             --increment pointer into array
if front>=max then            --rotate everything down & store just latest
    set i=3                   --key strokes
    repeat while i<=max
        set tmp=me(mGet,i)
        me(mPut,i-2,tmp)
        set i=i+1
    end repeat
    set front=max-1
end if
--put "put undo= " & CurPg & " " & Sactive & " front= " & front --method to get latest undo key stroke from buffer
Method mGetUndo
global undoFlg,CurPg,MakeActive,undo,articles,Sactive,CurObj,ObdoFlg,Swaiting
```

```
undo(mDeactivate)
if front>1 then
    set front=front-2        --grab last state of system
    if front=1 then set undoFlg=FALSE
    set tmp=me(mGet,front)       --grab the last frame #
    if tmp then                  --must be something in log
        set tmpa=me(mGet,front+1)    --then grab active sprite#
      if Sactive and CurObj<>0 then CurObj(mDeactivate)
      if tmp <> CurPg then
          set CurPg=tmp              --point to that frame
          set MakeActive=tmpa
          initpage()
        else
          if tmpa then
              set tmpo=articles(mGet,tmpa)  --get object
              tmpo(mActivate)    --activate correct article
            set CurObj=tmpo
          set ObdoFlg=TRUE
            set Swaiting=FALSE
          end if
      end if
--put "get undo= " & CurPg & " " & tmpa & " front= " & front
  end if
else
    set undoFlg=FALSE
end if --puts data in a circular queue - will overwrite if gets full
Method mPutQ data set rear=rear+1          --point at 1st data location
if rear>max then set rear=1      --have to wrap around
if rear=front then
    set front=front+1            --throw away old data
    if front>max then set front=1
end if
me(mPut,rear,data)
--put " rear= " & rear & " front= " & front --gets data from circular queue - returns 0 if queue empty
Method mGetQ if rear=front then       --queue is empty
  set flag=0
else
    set front=front+1
    if front>max then set front=1
    set flag=me(mGet,front)
--put " rear= " & rear & " front= " & front
end if
return (flag)

--puts proper headlines in clip page sprites
Method mShowClip
global headList,NumSelect
```

```
set tmpf=front          --save pointer
set headList=""
set flg=me(mGetQ)
repeat while flg<>0
   set headList=headList & flg
   set flg=me(mGetQ)
end repeat
set NumSelect=length(headList)/6 set front=tmpf

--factory to create selectable objects like articles & ads
Factory makeSelect

Method mNew snum
global pgSetup,CurPg,pgPtr,nav,movies,info,AnextFlg,AbackFlg,rel
instance SpriteNum,butList,ButNum,navList,relList,navPtr,relPtr,buttons,HeadWho set SpriteNum=snum
set navIndex=value(chars(pgSetup,pgPtr,pgPtr+2))
if navIndex<>0 then
   set navList=nav(mGet,navIndex)
--put navlist
   set i=1
   repeat while i<length(navList)         -- find correct pointer for this page
        set tmpf=value(chars(navList,i,i+1))   --grab frame number
      if tmpf=CurPg then
         set navPtr=i
         set i=length(navList)
      end if
--put "i= " & i & " frame= " & tmpf
      set i=i+4
   end repeat
end if
--put "abackflg/anextflg= " & AbackFlg & " " & AnextFlg
set pgPtr=pgPtr+4
set relIndex=value(chars(pgSetup,pgPtr,pgPtr+2))
set pgPtr=pgPtr+4
--set up related article list
if relIndex<>0 then set relList=rel(mGet,relIndex)
set headWho=chars(pgSetup,pgPtr,pgPtr+2)
set relIndex=value(chars(pgSetup,pgPtr,pgPtr+2))
set pgPtr=pgPtr+4
set butNum=value(chars(pgSetup,pgPtr,pgPtr))
set pgPtr=pgPtr+1
if ButNum then
   set buttons=makeArray(mNew,ButNum)

set i=1
   repeat while i <= ButNum
       set stmp=value(chars(pgSetup,pgPtr+2,pgPtr+3))
       set sdex=value(chars(pgSetUp,pgPtr+5,pgPtr+6))
       set pgPtr=pgPtr+8
```

```
        set sstr=info(mGet,sdex)        --grab the sound label
--put " stmp= " & string(stmp) & " sdex= " & string(sdex)
        set tmpobj=makeButton(mNew,stmp,sstr)

buttons(mPut,i,tmpobj)      --store object name in array
        set i=i+1
    end repeat
  else
        set pgPtr=pgPtr+1      --make sure points to next value
end if --makeSelect: dispose of object arrays created by this object
Method mClearObj if objectp(buttons) then --need to dispose of any button objects
    set j=1
    repeat while j <= ButNum
        set bobj=buttons(mGet,j)
        if objectp(bobj) then
          bobj(mDispose)
            buttons(mPut,j,empty)
        end if
        set j=j+1
    end repeat
    buttons(mDispose)     --get rid of array also
end if --makeSelect: deactivate article or ad
Method mDeactivate
global Sactive,ObdoFlg,Swaiting,CurObj,AFlg set the puppet of sprite 24 to TRUE
set the castnum of sprite 24=A14
spritebox  24,1,17,57,140
set the puppet of sprite 24 to FALSE
--updatestage
me(mClearObj)
set Sactive=0
set ObdoFlg=FALSE
set CurObj=0
set Swaiting=FALSE
set AFlg=FALSE --makeSelect: activate article or ad
Method mActivate
global Sactive,Swaiting,CurObj,AFlg,headList,CurPg,RelatedInfo,AbackFlg,AnextFlg
global ObdoFlg --put "factory makeselect activate"
if Sactive<>0 then
    if SpriteNum<>Sactive then
        CurObj(mDeactivate)
    end if
end if
set the puppet of sprite 24 to TRUE     --put up active article indicator
if NavPtr=1 then set the castnum of sprite 24 to A48
```

```
else set the castnum of sprite 24 to A38
set the locH of sprite 24=the right of sprite SpriteNum
set the locV of sprite 24=the top of sprite SpriteNum
set the puppet of sprite 24 to FALSE if navPtr=1 then
   set AbackFlg=FALSE
   set the castnum of sprite 23 to A34
else
   set AbackFlg=TRUE
   set the castnum of sprite 23 to A33
end if
if  navPtr=(length(navList)-2)  then
   set AnextFlg=FALSE
   set the castnum of sprite 22 to A32
else
   set AnextFlg=TRUE
   set the castnum of sprite 22 to A31
end if
--put "anext= " & anextflg & " aback= " & abackflg
--setup active article's related headlines info
set RelatedInfo=relList
--put "relList=" & relList
updatestage
set Sactive=SpriteNum
--set Swaiting=TRUE
set ObdoFlg=TRUE
set AFlg=TRUE --makeSelect: checks to see if article or its related buttons have been activated
Method mCkStatus
global Sactive,undolog,CurPg,makeActive,AnextFlg,AbackFlg,newPg
global savx,savy,lastx,lasty,CurObj set tmp=0
set savx=lastx
set savy=lasty
   set i=1
   set CurBut=0        --assume no button touched
   repeat while i<=ButNum
      set CurBut=buttons(mGet,i)
      set tmp=CurBut(mCkStatus)
      if tmp then
         set i=ButNum
      end if
      set i=i+1
   end repeat
   set lastx=savx
   set lasty=savy
   set tmp=ckbutton(SpriteNum)
   if tmp then
      if CurBut<>0 then
         CurBut(mDosomething)
         me(mActivate)
      else
```

```
                                    (navList,-2)         MJH  5-29-97
         if navPtr<(length(navList)-2) then
            if Sactive and Sactive<>Spritenum then CurObj(mDeactivate)
            undoLog(mPutUndo)    --save the state of the display
            set navPtr=navPtr+4
                set CurPg=value(chars(navList,navPtr,navPtr+1))
                set makeActive=value(chars(navList,navPtr+2,navPtr+2))
            set newPg=TRUE
         else
            me(mActivate)
         end if
      end if
   end if
end if
--put "sactive= " & Sactive &" sprite= " & SpriteNum & " tmp= " & tmp
return(tmp)

-- makeSelect: method to 'do something'when selection is made
Method mDoSomething
global undoLog,CurPg,active,AbackFlg,AnextFlg
global makeActive, Anext, newPg,related,headList,Sactive,clipLog,clip,Aback,toparticle --put "factory makeselect dosomething"

if active=22 then        --Anext button
   Anext(mDeactivate)
      If navPtr<(length(navList)-2) then
--put "navlist=" & navList & " length= " & length(navList)
         undoLog(mPutUndo)   --save the state of the display
         set navPtr=navPtr+4
            set CurPg=value(chars(navList,navPtr,navPtr+1))
            set makeActive=value(chars(navList,navPtr+2,navPtr+2))
         set newPg=TRUE
         me(mDeactivate)
      end if
--put "abackFlg= " & abackflg & " anextflg= " & anextflg
      exit
end if
if active=20 then         -- 'related' button
   related(mDeactivate)
   undoLog(mPutUndo)
   me(mDeactivate)
   set CurPg=label("RelatedPg")
   set newPg=TRUE
   exit
end if
if active=21 then         --clip button
   clip(mDeactivate)
--put "headWho= " & headWho & " pg= " & CurPg & " active= " & sactive
   if CurPg<10 then set filler="0"
   else set filler=""
   set tmp=headWho & filler & string(CurPg) & string(Sactive)
   clipLog(mPutQ,tmp)        --store the headline
--put "clipLog= " & tmp
   exit
end if
if active=23 then        --Aback button
   Aback(mDeactivate)
```

```
--put "aback navPtr= " & navPtr & " navlist= " & navList
  if navPtr>4 then
     undoLog(mPutUndo)    --save the state of the display
     set navPtr=navPtr-4
        set CurPg=value(chars(navList,navPtr,navPtr+1))
        set makeActive=value(chars(navList,navPtr+2,navPtr+2))
     set newPg=TRUE
     me(mDeactivate)
  end if
--put "aback flg= " & abackflg
   exit
end if
if active=24 then       --Top of article button
    toparticle(mDeactivate)
    undoLog(mPutUndo)   --save the state of the display
    set NavPtr=1
      set CurPg=value(chars(navList,navPtr,navPtr+1))
      set makeActive=value(chars(navList,navPtr+2,navPtr+2))
   set newPg=TRUE
   me(mDeactivate)
   exit
end if --factory to make headline objects
Factory makeHeadline --creates headline object
Method mNew snum
global headlist,CurPg,SecList,remCus
instance fnum,NextActive,SpriteNum set SpriteNum=snum
if CurPg=label("SectionsPg") then
      set i=(3*(snum-1))+1
--put "list= " & seclist & " snum=" & snum & " i= " & i
    set fnum=value(chars(Seclist,i,i+1))
    set NextActive=0
    set remCus=curPg
else
set i=(6*(snum-1))+1          --point to correct spot in string
--put "sprite= " & snum & " index= " & i & " headlist= " & headlist
set tmpcast=value(chars(headlist,i,i+2))
--set the puppet of sprite snum to TRUE
set the castnum of sprite spriteNum to tmpcast
--set the puppet of sprite snum to FALSE
set fnum=value(chars(headlist,i+3,i+4))
set NextActive=value(chars(headlist,i+5,i+5))
--put "i= " & i & " cast= " & tmpcast & " fnum= " & fnum
end if --put in to match select method
Method mClearObj nothing
--
```

```
--makeHeadline: deactivates the Headline    ᴺᵒᵗ 8-29-97
Method mDeactivate
global Swaiting,Sactive,ObdoFlg,CurObj,CurPg if CurPg<>label("SectionsPg") then
    set the ink of sprite SpriteNum to 8
    updatestage
end if
set Swaiting=FALSE
set Sactive=0
set ObdoFlg=FALSE
set CurObj=0

--method to activate the headline
Method mActivate
global Sactive,Swaiting,CurPg,ObdoFlg if Sactive then set the ink of sprite Sactive to 8
if CurPg<>label("SectionsPg") then
    set the ink of sprite SpriteNum to 4
    updatestage
end if
set Sactive=SpriteNum
set Swaiting=TRUE
set ObdoFlg=TRUE --makeHeadline: If this headline is selected, sets everything up for next page
Method mCkStatus set tmp=ckbutton(SpriteNum)
if tmp then
    me(mActivate)
end if
return(tmp)

-- makeHeadline: method to do something when headline active
Method mDoSomething
global CurPg,MakeActive,newPg,undoLog undoLog(mPutUndo)    --save the state of the display
me(mDeactivate)
set CurPg=fnum
--put "curpg = " & curpg
set MakeActive=NextActive
set newPg=TRUE
```

A12
```
--factory for weather, stock pages & classified
Factory makeChartButton

--creates the button
Method mNew snum
global pgSetup,pgPtr
instance SpriteNum,chartPtr,chartBeg,chartEnd,headWho
```

```
set SpriteNum=snum
set headwho="B13"
set chartBeg=value(chars(pgSetUp,pgPtr,pgPtr+2))
set pgPtr=pgPtr+4    --skip past cast num
set chartPtr=chartBeg
set chartEnd=chartBeg + value(chars(pgSetUp,pgPtr,pgPtr+2)) - 1
set pgPtr=pgPtr+3    --skip past # of chart views
--put "abackflg/anextflg= " & AbackFlg & " " & AnextFlg --deactivates chartbutton
Method mDeactivate
global Sactive,Swaiting,CurObj,ObdoFlg,Aflg set the ink of sprite SpriteNum to 3
set Swaiting=FALSE
set Sactive=0
set ObdoFlg=FALSE
set CurObj=0
set Aflg=FALSE --makeChartButton: activates chartbutton
Method mActivate
global Sactive,Swaiting,CurObj,WeatherPage,AbackFlg,AnextFlg,AFlg
global slidePtr,slideVal,ObdoFlg if Sactive<>0 then
    if SpriteNum <> SActive then CurObj(mDeactivate)
end if
set the ink of sprite SpriteNum=0
set i=(chartPtr-chartBeg)+1            --calc index for this weather region
set   i=4*(i-1)+1
set slidePtr=value(chars(slideVal,i,i+2))   --reset slide ptr
set the castnum of sprite 10 = chartPtr     --update view
set the puppet of sprite 13=TRUE            --move slide..
set the locv of sprite 13=slidePtr          --to new pos.
set the puppet of sprite 13=FALSE
if not WeatherPage then
  set AFlg=TRUE
   if chartPtr<=chartBeg then set AbackFlg=FALSE
   else set AbackFlg=TRUE
   if chartPtr >= chartEnd then set AnextFlg=FALSE
   else set AnextFlg=TRUE
    if AnextFlg then set the castnum of sprite 22 to A31   --turn on next
    else set the castnum of sprite 22 to A32               --turn off next
    if AbackFlg then set the castnum of sprite 23 to A33   --turn on back
    else set the castnum of sprite 23 to A34               --turn off back
end if
updatestage
set Sactive=Spritenum
set Swaiting=TRUE
set ObdoFlg=TRUE --stub for method needed by other factories
Method mClearObj
```

```
nothing

--checks status of chart button & of toggle button
Method mCkStatus
global undoLog set tmp=ckbutton(SpriteNum)
if tmp then
    undoLog(mPutUndo)
    me(mActivate)
end if
return(tmp)

--makeChartButton: checks slide or article buttons & controls the chart animation
Method mDoSomething
global button,slidePtr,slideVal,frameb,lastx
global WeatherPage,undoLog,CurPg,active,AbackFlg,AnextFlg,Aflg
global makeActive, Anext, newPg,related,headList,Sactive,clipLog,clip,Aback if WeatherPage then
   if lastx <> 0 then
      set tmp=TRUE
   else
      set tmp=readtouch()
   end if
   if tmp then
      set tmp=ckbutton(11)        --movie
      if tmp then
         button(mActivate)
           set Schartptr=chartPtr       --save old view
           set Sslideptr=slidePtr       --save old pos.
           set chartPtr=chartBeg        --reset to start view
         set i=0
         set j=1
         repeat while chartPtr+i <= chartEnd
            set the castnum of sprite 10 = chartPtr+i
            set the puppet of sprite 13=TRUE
               set the locv of sprite 13=value(chars(slideVal,j,j+2))
            set j=j+4
            set the puppet of sprite 13=FALSE
            updatestage
               set i=i+1
         end repeat
           set chartPtr=Schartptr
           set slidePtr=Sslideptr
           set the castnum of sprite 10 = chartPtr
           set the puppet of sprite 13=TRUE
           set the locv of sprite 13=slidePtr
           set the puppet of sprite 13=FALSE
           button(mDeactivate)
      else
         set tmp=ckbutton(12)        --frame-to-frame
         if tmp then
            frameb(mActivate)
              set chartPtr=chartPtr+1
            if chartPtr > chartEnd then
```

```
                set chartPtr=chartE  g   chartBeg  JWH 8-29-97
            end if
              set i=(chartPtr-chartBeg)+1
              set i=4*(i-1)+1
              set slidePtr=value(chars(slideVal,i,i+2))
            set the castnum of sprite 10 = chartPtr
            set the puppet of sprite 13=TRUE
            set the locv of sprite 13=slidePtr
            set the puppet of sprite 13=FALSE
            frameb(mDeactivate)
          end if
        end if
      end if
    else   --must be stock or classifieds page
      if active=22 then        --Anext button
        Anext(mDeactivate)
        if chartPtr < chartEnd then
            set chartPtr=chartPtr+1
            set the castnum of sprite 10 = chartPtr   --show new chart view
          if chartPtr=chartEnd then
            set AnextFlg=FALSE
              set the castnum of sprite 22 to A32    --cover up next button
          else
            set AnextFlg=TRUE
              set the castnum of sprite 22 to A31    --show next button
          end if
          set AbackFlg=TRUE
            set the castnum of sprite 23 to A33      --show back button
          updatestage
        end if
        exit
      end if
      if active=23 then       --Aback button
        Aback(mDeactivate)
        if chartPtr > chartBeg then
            set chartPtr=chartPtr-1
            set the castnum of sprite 10 = chartPtr --show new chart view
          if chartPtr=chartBeg then
            set AbackFlg=FALSE
              set the castnum of sprite 23 to A34    --cover up back button
          else
            set AbackFlg=TRUE
              set the castnum of sprite 23 to A33    --show back button
          end if
          set AnextFlg=TRUE
            set the castnum of sprite 22 to A31      --show next button
          updatestage
        end if
        exit
      end if
      if active=20 then          -- 'related' button
        related(mDeactivate)
        undoLog(mPutUndo)
        me(mDeactivate)
        set CurPg=label("RelatedPg")
       set newPg=TRUE
```

```
      exit
    end if
    if active=21 then        --clip button
      clip(mDeactivate)
      --put "headWho= " & headWho & " pg= " & CurPg & " active= " & sactive
      if CurPg < 10 then set filler="0"
      else set filler=""
        set tmp=headWho & filler & string(CurPg) & string(Sactive)
      clipLog(mPutQ,tmp)      --store the headline
      exit
    end if
end if --makeChartButton: doSomething --factory for customize pages
Factory makeCustom --method to create instances
Method mNew snum
global pgSetup,pgPtr
instance SpriteNum,goto set SpriteNum=snum
set goto=value(chars(pgSetup,pgPtr,pgPtr+1))
set pgPtr=pgPtr+3

--deactivate custom block selection
Method mDeactivate
global Sactive,ObdoFlg,Swaiting,CurObj set Sactive=0
set ObdoFlg=FALSE
set CurObj=0
set Swaiting=FALSE --makeCustom: activate article or ad
Method mActivate
global Sactive,Swaiting,CurObj,CurPg,RelatedInfo,newPg,ObdoFlg --put "factory makecustom activate"
if CurPg <> goto then
  set CurPg=goto
  set newPg=TRUE
end if set RelatedInfo=" "
set Sactive=SpriteNum
set Swaiting=TRUE
set ObdoFlg=TRUE --put in to match select method
Method mClearObj nothing --makeCustom: checks to see if a selection has been made
```

```
Method mCkStatus
global undoLog set tmp=ckbutton(SpriteNum)
if tmp then
    undoLog(mPutUndo)
    me(mActivate)
end if
return(tmp)

--makeCustom: check for selection & done button
Method mDoSomething
global noCheck,Check,done,active,lastx,lasty,undoLog --put "factory makecustom dosomething"
if lastx<>0 then
   set tmp=TRUE
else
    set tmp=readtouch()
end if
if tmp then
    set tmp=ckbutton(7)
    if tmp then
       if the castnum of sprite 10=Check then
          set the castnum of sprite 10= noCheck
       else
          set the castnum of sprite 10= Check
       end if
       updatestage
    else
       set tmp=ckbutton(8)
       if tmp then
          if the castnum of sprite 11=Check then
             set the castnum of sprite 11= noCheck
          else
             set the castnum of sprite 11= Check
          end if
          updatestage
       end if
    end if
end if
if active=13 then          --'done' button
    if the castnum of sprite 10=Check then set the ink of sprite 1=0
    else set the ink of sprite 1=3
    if the castnum of sprite 11=Check then set the ink of sprite 6=0
    else set the ink of sprite 6=3
    done(mDeactivate)
end if
```

A13
```
--macros

--Turns on touch screen
macro opentouch
  global port0
  openxlib "serialport"
  set port0=serialport(mnew,0)
--   set port1=serialport(mnew,1)
```

```
    port0(msetport,9600,8,1,"N")    MJH 5-24-92
    port0(msethand, 0,0,1)
--  port1(msethand, 0,0,1)
return --Turns off touch screen
macro closetouch
  global port0
  if objectp(port0) then
    port0(mDispose)
--    port1(mDispose)
  end if
return -- Reads "the touch" from the touch screen
macro readtouch
  global port0,touching,debounceFlg,debounce,touch,lastx,keytimer if debounceFlg then
    set flg=FALSE              --don't acknowledge touch until
    if debounce<the timer then --last one debounced
      set debounceFlg=FALSE
      if touch then port0(mReadFlush)
    end if
else
  set flg=TRUE                 --assume some key is down
    if lastx=0 then
      set keytimer=2
      if touch then
        set cnt=port0(mReadCount)  --get # char. in input port
      else
        if the mouseDown then
          set cnt=5
        else
          set cnt=0
        end if
      end if
      if cnt then
        if (cnt >= 4) then       --make sure we have x & y
          getxy
        else
          set flg=FALSE
        end if
      else
        set flg=FALSE
      end if
    else
        if keytimer then set keytimer=keytimer-1
        if keytimer=0 then
          set lastx=0
          set flg=FALSE
        end if
    end if
end if
return(flg)
```

```
                              from
--Determines x & y coordinates  in  raw touch data     AoH  8-29-97
macro getxy
   global lastx,lasty,port0,touching,debounce,debounceFlg,touch,abort
   --
if touch then
  set data=0
   repeat while (data-192)<0        --start with hi byte of x
      set data=port0(mReadChar)
   end repeat
    set lastx=(data-192)*64
   set data=port0(mReadChar)
    set lastx=lastx+(data-128)

-- 10= lowest 'x' on touchscreen & 128 = delta x set  lastx=((lastx-9)*640)/119
   set data=port0(mReadChar)
    set lasty=(data-64)*64
   set data=port0(mReadChar)
   set lasty=lasty+data --16 = lowest 'y' on touchscreen & 73 = delta y
   --touchscreen coordinates assumed backward for y dir.

set  lasty=(400-((lasty-14)*400)/74))
else
   set lastx=the mouseH
   set lasty=the mouseV
    if lastx>630 then set abort=TRUE
end if
set the timer=0
set debounce=the timer+5
set debounceFlg=TRUE
--set untouch=FALSE
set touching=TRUE
return --Delays 50 ms(4)
macro wait
   set stime=the timer            --save beginning time
   set tmp=0                      --init diff to zero
   repeat while tmp<4
      set tmp=(the timer-stime)   --find # ticks elapsed
   end repeat
return --macro to determine which button is down
macro ckbutton button
global lastx, lasty set tmp=0
if lastx < the right of sprite button then    --ck to see if touching it
   if lasty > the top of sprite button then
      if lastx > the left of sprite button then
         if lasty < the bottom of sprite button then
```

```
            set tmp=button
            set lastx=0
         -- set lasty=0
         end if
      end if
   end if
end if
return(tmp)

--monitor touch screen macro
macro monitor
global lastx,lasty,custom
global CurObj,clip,Anext,Aback,AnextFlg,AbackFlg,AFlg,toparticle
global Page,articles,Swaiting,ObdoFlg,NumSelect
global done,doneflg
  --
set tmp=readtouch()
if tmp then
--    put "x= " & lastx & " y = " & lasty
   set tmp=0
   if lastx<57 then
      Page(mCkStatus)
   else
      if AFlg then
         set tmp=toparticle(mCkStatus)
      end if
      if tmp=0 then
         if the castnum of sprite 14 <> 0 then set tmp=custom(mCkStatus)
         if tmp=0 then
            if doneflg then set tmp=done(mCkStatus)
            if tmp=0 then
               set i=1
               repeat while i<=NumSelect
                  set tmpo=articles(mGet,i)
                  set tmp=tmpo(mCkStatus)
                  if tmp<>0 then
                     set CurObj=tmpo
                     set i=NumSelect
                  end if
                  set i=i+1
               end repeat
            end if
         else
            Page(mDosomething)
         end if
      end if
      if CurObj=0 then set lastx=0
   end if
end if
--if untouch then
--   if Swaiting then
--      set ObdoFlg=TRUE
--      set Swaiting=FALSE
--   end if
--   set untouch=FALSE
--end if
```

```
return(tmp)

--power on initializations
macro PowerUp
global CurPg, Page,debounceFlg,keytimer,nwpg,port0,upyours
global active,undoFlg,sectionFlg,makeActive,abort,lastx,touch,WeatherPage --put the freebytes
set upyours=true
--init power on variables and hardware
rMovObj()
if touch then closetouch set abort=FALSE
set lastx=0
set keytimer=0
put the freebytes
set Page = layout(mNew)
if touch then opentouch
set CurPg=label("FrontPg")
--set waiting=FALSE
set active=FALSE
set debounceFlg=FALSE
set undoFlg=FALSE       --undo blank key
set sectionFlg=TRUE
set makeActive=0
set WeatherPage=FALSE
if touch then
repeat while port0(mgethand)=8
      nothing
      end repeat
end if
 if port0(mgethand)=0 then
        set l=0
          repeat while (label("load")+l) < (label("endload"))
             go to frame (label("load")+l)
          set l=l+1
          updatestage
        end repeat
        go to frame Curpg
           -- repeat while port0(mgethand)=0
           -- nothing
           -- end repeat
      end if
InitPage()
return --remove any objects from memory
macro rMovObj
global undo,frontpg,back,section,next,related,clip,anext,aback,undoLog,clipLog,info
global articles,nav,rel,Page,custom,done,toparticle,frameb,button if objectp(custom) then custom(mDispose)
if objectp(done) then done(mDispose)
if objectp(undo) then undo(mDispose)
```

```
                                    FrontPg                    BJH 8-29-97
if objectp(frontpg) then frontp  Dispose)
if objectp(back) then back(mDispose)
if objectp(section) then section(mDispose)
if objectp(next) then next(mDispose)
if objectp(related) then related(mDispose)
if objectp(clip) then clip(mDispose)
if objectp(anext) then anext(mDispose)
if objectp(aback) then aback(mDispose)
if objectp(toparticle) then toparticle(mDispose)
if objectp(frameb) then frameb(mDispose)
if objectp(button) then button(mDispose)

if objectp(undoLog) then undoLog(mDispose)
if objectp(clipLog) then clipLog(mDispose)
if objectp(info) then info(mDispose)
if objectp(articles) then
    articles(mClearObj)
    articles(mDispose)
end if
if objectp(nav) then nav(mDispose)
if objectp(rel) then rel(mDispose)
if objectp(Page) then Page(mDispose)
return --set up new page
macro InitPage
global Page, CurPg,newPg,pgSetup,articles,NumSelect
global backFlg, frontpgFlg, nextFlg,sectionFlg,headList,rel
global active,pgPtr,makeActive
global CurObj,ObdoFlg,Swaiting,Sactive,undoLog
global AbackFlg,AnextFlg,clipLog
global RelatedInfo,slidePtr,slideVal
global remPg,undoFlg,remCus
global CusPtr,Aflg,WeatherPage,doneflg --put "active= " & active
--put "Sactive= " & Sactive & " ObdoFlg= " & ObdoFlg
set nextFlg=TRUE
if CurPg= label("FrontPg") then
   set backFlg=FALSE
   set frontpgFlg=FALSE
else
   set frontpgFlg=TRUE
   set backFlg = TRUE
--    if CurPg >= label("Classified") then set nextFlg=FALSE
--    if CurPg > label("Classified") then set backFlg=FALSE
end if
if CurPg<>label("SectionsPg") then set sectionFlg=TRUE
if CurPg<=label("Classified") then set remPg=CurPg
set doneflg=FALSE
set CurObj=0
set ObdoFlg=0
set Swaiting=0
set Sactive=0
```

```
articles(mClearObj)
set pgSetup=Page(mGet,CurPg-1)
--put ""pgSetup= " & pgSetup
set OType=chars(pgSetUp,1,1)
--put "Otype=" & OType
set NumSelect=value(chars(pgSetup,2,2))

set newPg=0
go to frame CurPg
if undoFlg=FALSE then
    if the castnum of sprite 15<>A16 then
        set the castnum of sprite 15 to A16
        updatestage
    end if
else
    if the castnum of sprite 15<>A15 then
        set the castnum of sprite 15 to A15
        updatestage
    end if
end if if OType="H" then        --headline page
    set headList=RelatedInfo            --assume related page
        if CurPg=label("RelatedPg") then set NumSelect=(length(headList)/6)
--put "nselect=" & numselect
--put "headlist for initpage=" & headList
    if CurPg=label("ClipPg") then
        clipLog(mShowClip)
    end if
    set i=1
    repeat while i <=NumSelect
        set tmpo=makeHeadLine(mNew,i)
        articles(mPut,i,tmpo)
        set i=i+1
    end repeat
    if makeActive<>0 then
        set the ink of sprite makeActive to 4
        set Sactive=makeActive
        set makeActive=0
    end if
    updatestage
else
    set pgPtr=4
    if OType="C" then        --chart
        set i=1
        repeat while i <=NumSelect
            set tmpo=makeChartButton(mNew,i)
            articles(mPut,i,tmpo)
            set i=i+1
        end repeat
        if makeActive=0 then set makeActive=1
        set tmp=chars(pgSetup,pgPtr,pgPtr)
        if tmp="W" then
            set WeatherPage=TRUE    --tell DoSomething which routine to use
            set slidePtr=value(chars(slideVal,1,3))
            set PgPtr=PgPtr+2        -- skip past the "W,"
```

```
      else
        set WeatherPage=FALSE
      end if
    else
      if OType="T" then
        set i=1
        repeat while i <= NumSelect
          set tmpObj=makeCustom(mNew,i)
            articles(mPut,i,tmpObj)
          set i=i+1
        end repeat
        if makeActive=0 then
          set makeActive=1
        end if
        set doneflg=TRUE
      else
        set i=1
        repeat while i <= NumSelect
          set tmpObj=makeSelect(mNew,i)
            articles(mPut,i,tmpObj)
          set i=i+1
        end repeat
      end if
    end if
end if
if pgPtr<length(pgSetup) then
    set tmp=chars(pgSetup,pgPtr,pgPtr)
  if tmp="A" then
    set l=0
      set aname=chars(pgSetup,pgPtr+1,pgPtr+6)
        set fnumber=value(chars(pgSetup,pgPtr+7,pgPtr+8))
      set pgPtr=pgPtr+10
      repeat while l<fnumber         -- loop through the animation frames
          go to frame (label(aname) + l)
        set l=l+1
      end repeat
      go to frame Curpg
    end if if pgPtr<length(pgSetup) then
        set tmp=chars(pgSetup,pgPtr,pgPtr)
      if tmp = "C" then
          set CusPtr=value(chars(pgSetup,pgPtr+1,pgPtr+2))
        set remcus=CurPg
      end if
    end if
end if if makeActive<>0 then
    set CurObj=articles(mGet,makeActive)
    if objectp(CurObj) then
        CurObj(mActivate)
      set ObDoFlg=TRUE
    else
        CurObj=0
    end if
```

```
    set makeActive=0
end if
return

-- initializes arrays for the newspaper
macro setupinit
global undo, frontpg, back, section, next,Page,undoFlg
global related, clip, anext, aback,nav, rel,undoLog,clipLog
global info,custom,articles, done,toparticle
global frameb,button --arguments for makeButton are...
--sprite#, cast#, optional label set custom=makeButton(mNew,14," ")
set done=makeButton(mNew,13," ")
set undo=makeButton(mNew,15," ")
set frontpg=makeButton(mNew,16," ")
set back=makeButton(mNew,17," ")
set section=makeButton(mNew,18, " ")
set next=makeButton(mNew,19, " ")
set related=makeButton(mNew,20, " ")
set clip=makeButton(mNew,21, " ")
set anext=makeButton(mNew,22, " ")
set aback=makeButton(mNew,23, " ")
set toparticle=makeButton(mNew,24," ")
set button=makeButton(mNew,11," ")
set frameb=makeButton(mNew,12," ")
set undoLog=makeArray(mNew,12)
set clipLog=makeArray(mNew,8)
set info=makeArray(mNew,2)
set articles=makeArray(mNew,9)
set nav=makeArray(mNew,10)
set rel=makeArray(mNew,4)
return --return to main loop from new frame
macro goback return --main loop
macro RunPaper
global newPg, CurPg,port0,Page,active,ObdoFlg,upyours
global CurObj,touch,abort,lastx,lasty repeat while abort=FALSE
--read serial port0 for base unit signal
    if touch then
if upyours then
if port0(mgethand)=8 then
set upyours=false
end if
else
--put port0(mgethand)
```

```
        if port0(mgethand)=0 then
set upyours=true
     set l=0
         repeat while (label("load")+l) < (label("endload"))
            go to frame (label("load")+l)
            set l=l+1
         updatestage
         end repeat
         go to frame Curpg
           -- repeat while port0(mgethand)=0
           --   nothing
           -- end repeat
     end if
     if the mousedown then set abort=TRUE
end if
  end if
    monitor()
  if ObdoFlg then
     CurObj(mDoSomething)
  end if
  if newPg then
     InitPage()
  end if
end repeat
if touch then closetouch
rMovObj()

go to frame "TheEnd"
```

What is claimed is:

1. A publication system comprising:
   a) means at a publisher's facility for producing a periodical publication in digital form;
   b) means for transmitting said periodical publication in digital form to a cable television service provider;
   c) a memory and display system at a subscriber location for receiving and storing said publication from said cable television service provider over a cable system and including a display for visually displaying said periodical;
   wherein said memory and display system comprises:
      i. a base unit which is coupled to said cable system to receive and process information including said publication, and
      ii. a portable memory/display unit which
         iia. includes a display and a memory,
         iib. is removably mounted and electrically coupled to said base unit,
         iic. comprises central processing means for inputting data and displaying data on said display,
         iid. is capable of storing and formatting an entire publication transferred from said base unit for presentation on said display, and
         iie. is capable of displaying an entire publication to a user while removed from said base unit.

2. The publication system as recited in claim 1 wherein said publication is transmitted to said subscriber location over a television channel dedicated to periodical delivery.

3. The publication system as recited in claim 2 wherein said television channel is dedicated to newspaper delivery.

4. The publication system as recited in claim 1 wherein a plurality of common publications are simultaneously transmitted over a single channel to a plurality of subscribers.

5. The publication system as recited in claim 4 wherein said memory and display system inputs said plurality of publications received by said base unit from said cable system for storage in said memory of said portable memory/display unit.

6. The publication system as recited in claim 4 wherein said portable memory/display unit comprises means for blocking said user from viewing at least one of said plurality of publications, and wherein said portable memory/display unit is capable of selecting a publication to be transferred from said base unit for presentation on said display if a portion of the information contained in the publication matches predetermined data stored in said portable memory/display unit.

7. The publication system as recited in claim 4 wherein said portable memory/display unit stores only a selected portion of said publications in said memory.

8. The publication system as recited in claim 1 wherein said portable memory/display unit is battery powered.

9. The publication system as recited in claim 1 wherein said memory and display system further comprises a means for communicating over a telephone line and further comprising a remote location for receiving orders over said telephone line.

10. The publication system as recited in claim 1 wherein said display of said portable memory/display unit comprises a reflective light display and a surface acoustic wave touch screen.

11. The publication system as recited in claim 10 wherein said reflective light display comprises liquid crystals in an encapsulant.

12. The publication system as recited in claim 11 wherein said liquid crystals are nematic with a positive dielectric anisotropy and said encapsulant has a dielectric constant as great as the lower dielectric constant of said crystal.

13. The publication system of claim 1 wherein said memory in said portable memory/display unit is sufficiently large to store ASCII representations of text in a plurality of newspapers and graphics files or images in said plurality of newspapers.

14. The publication system of claim 13 further comprising a second removably mountable memory and display unit which is capable of being removably mounted on said base, said second removably mountable memory and display unit receiving and storing and formatting one of a plurality of publications from said cable system via said base, and wherein said base processes and relays said one of said plurality of publications to said second removably mountable memory and display unit if said one of said plurality of publications is intended for said second removably mountable memory and display unit.

15. The publication system of claim 1 wherein said transmitting means transmits said periodical publication in digital form over a satellite link to said cable television service provider.

16. The publication system of claim 1 wherein said transmitting means transmits said periodical publication in digital form using broadband transmission.

17. The publication system of claim 16 wherein said broadband transmission is over a satellite link to said cable television service provider.

* * * * *